US012559598B2

(12) United States Patent
Nelson

(10) Patent No.: US 12,559,598 B2
(45) Date of Patent: Feb. 24, 2026

(54) PROCESSES AND SYSTEMS FOR MAKING PARTICULATE MASTERBATCHES, AND COMPOSITIONS OBTAINED THEREFROM

(71) Applicant: GranBio Intellectual Property Holdings, LLC, Thomaston, GA (US)

(72) Inventor: Kimberly Nelson, Atlanta, GA (US)

(73) Assignee: GranBio Intellectual Property Holdings, LLC, Thomaston, GA (US)

(*) Notice: Subject to any disclaimer, the term of this patent is extended or adjusted under 35 U.S.C. 154(b) by 371 days.

(21) Appl. No.: 18/103,454

(22) Filed: Jan. 30, 2023

(65) Prior Publication Data

US 2023/0242715 A1 Aug. 3, 2023

Related U.S. Application Data

(60) Provisional application No. 63/305,386, filed on Feb. 1, 2022.

(51) Int. Cl.
*C08J 3/22* (2006.01)
*C08J 5/02* (2006.01)

(52) U.S. Cl.
CPC . *C08J 3/22* (2013.01); *C08J 5/02* (2013.01); *C08J 2321/02* (2013.01)

(58) Field of Classification Search
CPC ... C08J 3/22; C08J 5/02; C08J 2321/02; C08J 3/212; C08J 3/226
USPC ........................................................ 523/351
See application file for complete search history.

(56) References Cited

U.S. PATENT DOCUMENTS 9,316,439 B2 4/2016 Tucker
2009/0062428 A1 3/2009 Zhang et al.
2011/0021664 A1 1/2011 Wang et al.
2012/0108725 A1 5/2012 Pierre et al.
2018/0179343 A1* 6/2018 Mitsui .................... C08J 3/212
2018/0327577 A1* 11/2018 Cernohous ............... C08J 3/201

FOREIGN PATENT DOCUMENTS

EP 2173793 B1 5/2013

OTHER PUBLICATIONS

PCT/US2023/011983 International Search Report and Written Opinion dated Jun. 9, 2023 (ISA/KR).
Johnson, "Top 5 Benefits of Using Polymer Masterbatches _ Microban", https://www.microban.com/blog/top-5-benefits-of-using-polymer-masterbatches (retrieved Jul. 29, 2024).

* cited by examiner

*Primary Examiner* — Hannah J Pak
(74) *Attorney, Agent, or Firm* — O'Connor & Company; Ryan P. O'Connor

(57) ABSTRACT

Improved processes and systems are disclosed for making masterbatches of particulates to be incorporated into polymers. In some variations, a process for making a particulate masterbatch comprises the sequential steps of: providing particulates; conveying an aqueous polymer latex and the particulates to a mixing unit, thereby generating a particulate-latex mixture comprising water; conveying the particulate-latex mixture to a homogenizer; conveying the homogenized particulate-latex mixture to a centrifuge to remove a first portion of water; and then conveying the dewatered and homogenized particulate-latex mixture to a screw mixer configured to remove a second portion of water, thereby generating a particulate masterbatch. Other variations employ polymer solids rather than a polymer latex. The processes and systems enable higher energy efficiency, more robust operability that minimizes process fouling, and exceptional particulate dispersion within the masterbatch. Also, these processes do not require the use of a latex coagulant.

16 Claims, 3 Drawing Sheets

PROCESSES AND SYSTEMS FOR MAKING PARTICULATE MASTERBATCHES, AND COMPOSITIONS OBTAINED THEREFROM

PRIORITY DATA

This patent application claims priority to U.S. Provisional Patent App. No. 63/305,386, filed on Feb. 1, 2022, which is hereby incorporated by reference herein.

FIELD

The present invention generally relates to processes and systems for making masterbatches of particulates that may then be incorporated into various matrix materials, such as polymers.

BACKGROUND

Particulate composites are extremely important worldwide, with many commercial applications. A "particulate composite" refers to a composite that includes a matrix material and finely divided particulates suspended in the matrix material. The particulates can significantly improve the strength, rigidity, and toughness of the matrix material, which may be a polymer, a ceramic material, or another type of matrix material. Particulate composites have been developed to achieve unusual combinations of properties (e.g., hardness, strength, thermal properties, corrosion resistance, etc.) that are typically unachievable with the matrix materials alone.

A common example of a particulate composite is the combination of nanoparticulates with a polymer. For instance, the rigidity, dimensional stability, and thermal stability of inorganic nanoparticulates may be combined with the toughness, processability, chemical stability, and/or low cost of a polymer.

However, a particulate-filled polymer material prepared by simple blending does not typically work. One reason is that when the particulate size is small—usually required to achieve the desired benefit—the particulate surface energy is very large, causing self-aggregation between particulates. On the other hand, the inhomogeneity of the mixture makes it difficult to completely eliminate the interfacial tension between the particulates and the polymer matrix, which causes poor dispersion of the particulates in the polymer. What is normally desirable is for the particulates to be finely divided and well-dispersed in the polymer matrix, to avoid particulate agglomeration. One solution is generally known as a masterbatch.

The use of a particulate masterbatch has the potential to improve product consistency and process stability through better dispersion. As masterbatches are already premixed compositions in which the particulate is properly dispersed in a host resin, masterbatches can alleviate the issues with clumping or insufficient dispersion noted above. Masterbatches are commonly used in polymer processing to incorporate color pigments and antimicrobials into the polymer resin. The masterbatch is a concentrated mixture of an additive encapsulated in a carrier material, such as polyethylene or polypropylene. Masterbatches allow for less-complicated addition through pellet-to-pellet blending or addition at an extruder. No specialized dosing equipment for minute amounts of additive is needed. Masterbatches also reduce the precision of addition required to achieve the same addition rate in the final product.

Despite the aforementioned benefits of masterbatches, there remains a desire for improved processes for making a particulate masterbatch composition. Needs in the art include higher energy efficiency, more robust operability that minimizes process fouling and plugging, and improved particulate dispersion within the masterbatch.

In view of the aforementioned needs in the art, improved processes and systems are needed for making masterbatches of particulates to be incorporated into polymers and other matrix materials.

SUMMARY

In some variations, the invention provides a process for making a particulate masterbatch, the process comprising:

(a) providing a plurality of particulates;

(b) optionally introducing the plurality of particulates and a pH-adjusting agent to a first mixing unit;

(c) conveying an aqueous polymer latex and the plurality of particulates from step (a) or from step (b), if conducted, to a second mixing unit, thereby generating a particulate-latex mixture comprising water;

(d) optionally conveying the particulate-latex mixture and a first process additive to a third mixing unit;

(e) conveying the particulate-latex mixture to a homogenizer, thereby generating a homogenized particulate-latex mixture;

(f) optionally conveying the homogenized particulate-latex mixture to a centrifuge to remove a first portion of the water, thereby generating a dewatered and homogenized particulate-latex mixture; and (g) conveying the dewatered and homogenized particulate-latex mixture (or, if step (f) is not conducted, the homogenized particulate-latex mixture from step (e)) to a screw mixer, wherein the screw mixer is configured to remove a second portion of the water, thereby generating a particulate masterbatch, wherein steps (a), (c), (e), (f), and (g) are substantially conducted sequentially.

When step (b) but not step (d) is included in the process, preferably steps (a)-(c) and then (e)-(g) are substantially conducted sequentially. When step (d) but not step (b) is included in the process, preferably step (a) and then steps (c)-(g) are substantially conducted sequentially. When both steps (b) and (d) are included in the process, preferably steps (a)-(g) are substantially conducted sequentially.

In some embodiments, at least one of the first mixing unit, the second mixing unit, and the third mixing unit is a static inline mixer. In certain embodiments, at least two of the first mixing unit, the second mixing unit, and the third mixing unit is a static inline mixer. In preferred embodiments, each of the first mixing unit, the second mixing unit, and the third mixing unit is a static inline mixer. In preferred embodiments, whether or not steps (b) and (d) are employed, the second mixing unit utilized in step (c) is a static inline mixer.

There may be an additional static inline mixer upstream of the first mixing unit in step (b), or upstream of the second mixing unit in step (c), to mix multiple types of particulates. In some embodiments, the different particulates are first introduced to a pre-mixing unit (i) prior to step (b), if conducted, or (ii) prior to step (c). The pre-mixing unit may be a static inline pre-mixer or another type of mixing unit.

In some embodiments, the plurality of particulates is first slurried prior to step (b). Slurrying is carried out in a slurrying unit, by adding water or another solvent for the particulates. The slurrying unit may be, but not limited to, a simple vessel or tank with agitator, homogenizer, batch or inline rotor-stator mixer, kneader mixer, co-rotating or counter-rotating paddle shafts mixer, inline tube static mixer, eductor mixer, etc.

In some embodiments, the centrifuge is a decanter centrifuge configured to remove a first portion of the water, thereby generating a dewatered and homogenized particulate-latex mixture.

In some embodiments, step (f) utilizes preheating of the homogenized particulate-latex mixture to enhance water removal. Generally, it is preferable for step (f) to utilize heating to enhance water removal.

In some embodiments, the screw mixer is a screw extruder, such as (but not limited to) a twin-screw extruder. A twin-screw extruder may be configured with a plurality of extruder zones with independently controlled temperatures, and/or a plurality of vacuum vents for enhanced removal of the second portion of water, and/or one or more side feeders for adding chemicals such as process additives. In some embodiments, the screw mixer is a twin-rotor mixer.

The process may comprise introducing a process additive in any step of the process.

The process may be continuous, semi-continuous, batch, or semi-batch. Preferably, the process is substantially continuous.

In some processes, the particulate masterbatch is characterized by a dispersion index of at least 50, preferably at least 75, and more preferably at least 90.

In some preferred embodiments, the process does not employ a polymer latex coagulating agent.

The plurality of particulates may include biomass-derived particulates selected from the group consisting of cellulose, nanocellulose, hemicellulose, nanohemicellulose, lignin, nanolignin, nanolignocellulose, and combinations thereof, for example.

The plurality of particulates may include particulates selected from the group consisting of silica, alumina, clay, nano-clay, zeolites, ceramics, metals, glass, polymers, and combinations thereof, for example.

The plurality of particulates may include carbonaceous particulates selected from the group consisting of carbon black, graphite, graphene, activated carbon, carbon nanotubes, carbon fibers, biochar, coke, nanodiamonds, and combinations thereof, for example.

In some embodiments, the particulates include, or consist essentially of, nanocellulose. In other embodiments, the particulates do not include nanocellulose.

In some embodiments, the particulates include, or consist essentially of, carbon black. In other embodiments, the particulates do not include carbon black.

In some embodiments, there are at least two types of particulates. In these embodiments, at least one type of particulates may be slurried prior to step (b). Both types of particulates may be slurried in separate slurrying units and then combined, or they may be slurried together, or a combination thereof.

In some embodiments, the particulates include, or consist essentially of, nanocellulose and carbon black. In other embodiments, the particulates include neither nanocellulose nor carbon black.

In some variations, the invention provides a particulate masterbatch product produced by a process comprising:

(a) providing a plurality of particulates;

(b) optionally introducing the plurality of particulates and a pH-adjusting agent to a first mixing unit;

(c) conveying an aqueous polymer latex and the plurality of particulates from step (a) or from step (b), if conducted, to a second mixing unit, thereby generating a particulate-latex mixture comprising water;

(d) optionally conveying the particulate-latex mixture and a first process additive to a third mixing unit;

(e) conveying the particulate-latex mixture to a homogenizer, thereby generating a homogenized particulate-latex mixture;

(f) optionally conveying the homogenized particulate-latex mixture to a centrifuge to remove a first portion of the water, thereby generating a dewatered and homogenized particulate-latex mixture; and (g) conveying the dewatered and homogenized particulate-latex mixture (or, if step (f) is not conducted, the homogenized particulate-latex mixture from step (e)) to a screw mixer, wherein the screw mixer is configured to remove a second portion of the water, thereby generating a particulate masterbatch, wherein steps (a), (c), (e), (f), and (g) are substantially conducted sequentially.

In some variations, the invention provides a system for making a particulate masterbatch, the system configured to carry out a process comprising:

(a) providing a plurality of particulates;

(b) optionally introducing the plurality of particulates and a pH-adjusting agent to a first mixing unit;

(c) conveying an aqueous polymer latex and the plurality of particulates from step (a) or from step (b), if conducted, to a second mixing unit, thereby generating a particulate-latex mixture comprising water;

(d) optionally conveying the particulate-latex mixture and a first process additive to a third mixing unit;

(e) conveying the particulate-latex mixture to a homogenizer, thereby generating a homogenized particulate-latex mixture;

(f) optionally conveying the homogenized particulate-latex mixture to a centrifuge to remove a first portion of the water, thereby generating a dewatered and homogenized particulate-latex mixture; and (g) conveying the dewatered and homogenized particulate-latex mixture (or, if step (f) is not conducted, the homogenized particulate-latex mixture from step (e)) to a screw mixer, wherein the screw mixer is configured to remove a second portion of the water, thereby generating a particulate masterbatch, wherein steps (a), (c), (e), (f), and (g) are substantially conducted sequentially.

In some variations, the invention provides a system for making a particulate masterbatch, the system comprising:

(i) optionally, a first mixing unit configured for mixing a plurality of particulates and a pH-adjusting agent;

(ii) a second mixing unit in flow communication with the first mixing unit (if present), wherein the second mixing unit is configured for mixing the plurality of particulates and an aqueous polymer latex;

(iii) optionally, a third mixing unit in flow communication with the second mixing unit, wherein the third mixing unit is configured for mixing the particulate-latex mixture and one or more process additives;

(iv) a homogenizer in flow communication with the third mixing unit, if present, or the second mixing unit, wherein the homogenizer is configured to generate a homogenized particulate-latex mixture;

(v) optionally, a centrifuge in flow communication with the homogenizer, wherein the centrifuge is configured to remove a first portion of water, thereby generating a dewatered and homogenized particulate-latex mixture; and (vi) a screw mixer in flow communication with the centrifuge (or with the homogenizer if the centrifuge is omitted), wherein the screw mixer is configured to remove a second portion of water, thereby generating a particulate masterbatch; and (vii) an output for recovering the particulate masterbatch.

Other variations of the invention utilize polymer solids rather than polymer latex, or in addition to polymer latex.

Some variations provide a process for making a particulate masterbatch, the process comprising:

(a) providing a plurality of particulates in the form of a particulate slurry comprising water;

(b) optionally, introducing the particulate slurry and a first process additive to a first mixing unit, wherein the first process additive comprises a pH-adjusting agent;

(c) optionally conveying the particulate slurry and a second process additive to a second mixing unit;

(d) optionally conveying the particulate slurry to a homogenizer;

(e) optionally conveying the particulate slurry to a centrifuge to remove a first portion of the water;

(f) conveying the particulate slurry, polymer solids, and optionally a third process additive to a screw mixer, wherein the screw mixer is configured to remove a second portion of the water, thereby generating a particulate masterbatch, wherein step (a), any optional steps (b) to (e), and step (f) are substantially conducted sequentially.

In some embodiments, steps (b), (c), (d), and (e) are conducted, and steps (a)-(f) are substantially conducted sequentially. In certain embodiments, one or two of steps (b), (c), (d), and (e) are conducted, and all process steps are substantially conducted sequentially. In certain embodiments, step (b) is conducted.

In some embodiments, the first mixing unit is a first static inline mixer. In these or other embodiments, the second mixing unit is a second static inline mixer.

In some embodiments, the plurality of particulates is first introduced to a pre-mixing unit prior to step (b). For example, the plurality of particulates may be slurried with water in the pre-mixing unit, which may be referred to as a slurrying unit when a slurry is formed.

In some embodiments employing step (e), the centrifuge is a decanter centrifuge.

The second process additive may be a compatibilizer for compatibilizing the particulates with the polymer solids. Alternatively, or additionally, the third process additive may be a compatibilizer for compatibilizing the particulates with the polymer solids. The third process additive may be conveyed directly to the screw mixer via an inlet port, or may be added to the input stream that is introduced to the screw mixer.

In some embodiments, step (f) utilizes heating to enhance water removal from the screw mixer. Optionally, there is preheating in step (f), or prior to step (f), to preheat the particulate slurry to enhance water removal from the screw mixer.

In some embodiments, the screw mixer is a twin-screw extruder. The twin-screw extruder may be configured with a plurality of extruder zones with independently controlled temperatures, and a plurality of vacuum vents, for enhanced removal of the second portion of water. In other embodiments, the screw mixer is a twin-rotor mixer.

In some embodiments, the process is continuous or semi-continuous. In other embodiments, the process is batch or semi-batch.

The particulate masterbatch may be characterized by a dispersion index of at least 50, at least 75, or at least 90, for example.

Preferably, the process does not employ a polymer latex coagulating agent.

The plurality of particulates may contain at least two types of particulates, wherein at least one type of particulates is slurried prior to step (b).

In some embodiments, the plurality of particulates includes biomass-derived particulates selected from the group consisting of cellulose, nanocellulose, hemicellulose, nanohemicellulose, lignin, nanolignin, nanolignocellulose, and combinations thereof.

In some embodiments, the plurality of particulates includes particulates selected from the group consisting of silica, alumina, clay, nano-clay, zeolites, ceramics, metals, glass, polymers, and combinations thereof.

In some embodiments, the plurality of particulates includes carbonaceous particulates selected from the group consisting of carbon black, graphite, graphene, activated carbon, carbon nanotubes, carbon fibers, biochar, coke, nanodiamonds, and combinations thereof.

In certain embodiments, the particulates include nanocellulose. In various embodiments, the particulates do not include nanocellulose.

In certain embodiments, the particulates include carbon black. In various embodiments, the particulates do not include carbon black.

In certain embodiments, the particulates include nanocellulose and carbon black. In other embodiments, the particulates include neither nanocellulose nor carbon black.

In some variations, the invention provides a particulate masterbatch product produced by a process comprising:

(a) providing a plurality of particulates in the form of a particulate slurry comprising water;

(b) optionally, introducing the particulate slurry and a first process additive to a first mixing unit, wherein the first process additive comprises a pH-adjusting agent;

(c) optionally conveying the particulate slurry and a second process additive to a second mixing unit;

(d) optionally conveying the particulate slurry to a homogenizer;

(e) optionally conveying the particulate slurry to a centrifuge to remove a first portion of the water;

(f) conveying the particulate slurry, polymer solids, and optionally a third process additive to a screw mixer, wherein the screw mixer is configured to remove a second portion of the water, thereby generating a particulate masterbatch, wherein step (a), any optional steps (b) to (e), and step (f) are substantially conducted sequentially.

In some variations, the invention provides a system for making a particulate masterbatch, the system configured to carry out a process comprising:

(a) providing a plurality of particulates in the form of a particulate slurry comprising water;

(b) optionally, introducing the particulate slurry and a first process additive to a first mixing unit, wherein the first process additive comprises a pH-adjusting agent;

(c) optionally conveying the particulate slurry and a second process additive to a second mixing unit;

(d) optionally conveying the particulate slurry to a homogenizer;

(e) optionally conveying the particulate slurry to a centrifuge to remove a first portion of the water;

(f) conveying the particulate slurry, polymer solids, and optionally a third process additive to a screw mixer, wherein the screw mixer is configured to remove a second portion of the water, thereby generating a particulate masterbatch, wherein step (a), any optional steps (b) to (e), and step (f) are substantially conducted sequentially.

In some variations, the invention provides a system for making a particulate masterbatch, the system comprising:

(i) optionally, a first mixing unit configured for mixing a plurality of particulates and a pH-adjusting agent (as first process additive);

(ii) optionally, a second mixing unit in flow communication with the first mixing unit, wherein the second mixing unit is configured for mixing the plurality of particulates with a second process additive;

(iii) optionally, a homogenizer in flow communication with the second mixing unit, if present, or the first mixing unit;

(iv) optionally, a centrifuge in flow communication with the homogenizer, if present, or the second mixing unit, if present, or the first mixing unit, wherein the centrifuge is configured to remove a first portion of water;

(v) a screw mixer in flow communication with the centrifuge (or with the homogenizer if the centrifuge is omitted, or the second mixing unit if the homogenizer is omitted, or the first mixing unit if the second mixing unit is omitted), wherein the screw mixer is configured to remove a second portion of water, thereby generating a particulate masterbatch; and (vi) an output for recovering the particulate masterbatch.

DETAILED DESCRIPTION OF SOME EMBODIMENTS

Figure 1:
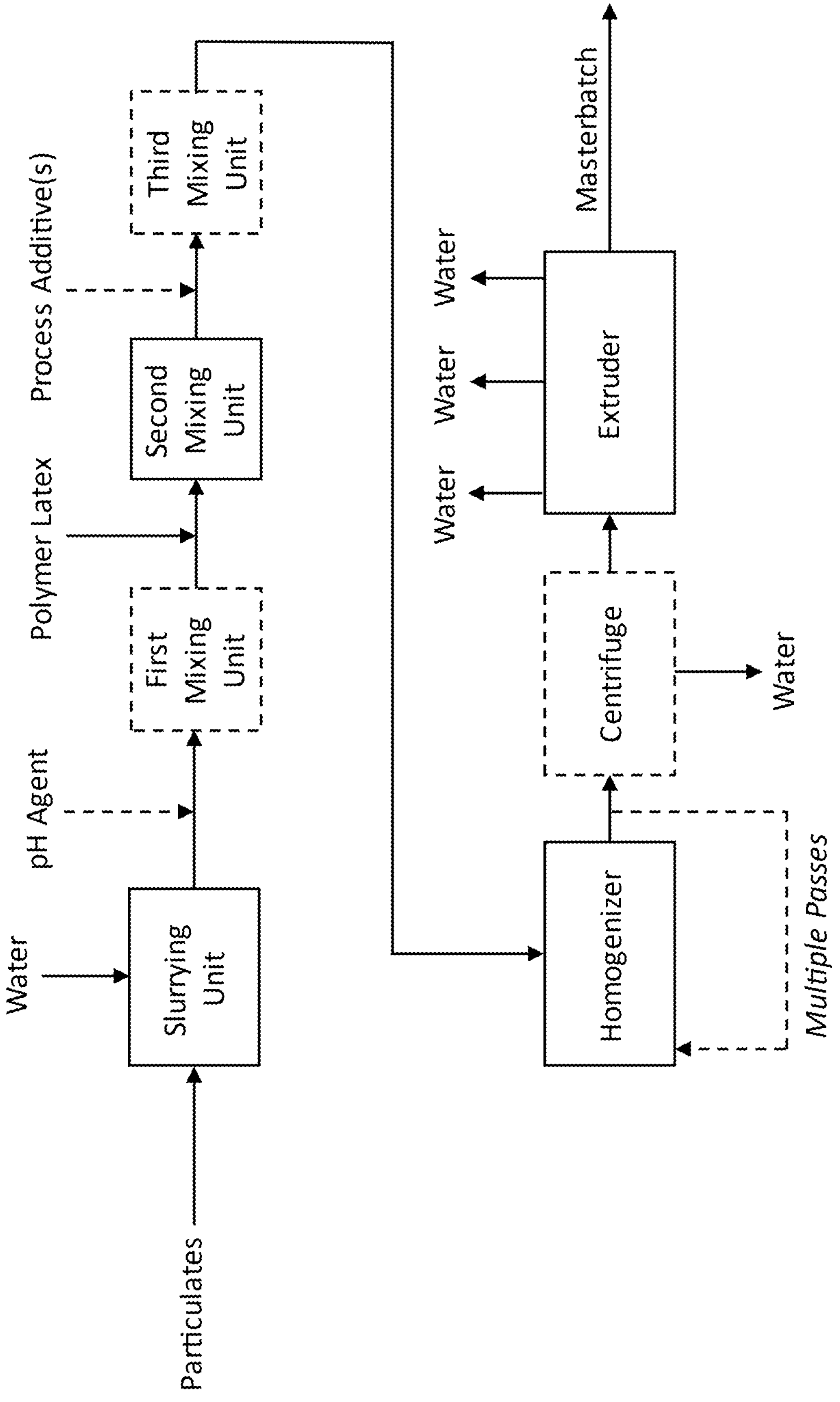
FIG. 1 is an exemplary block-flow diagram depicting processes and systems of the invention, in some embodiments using polymer latex. Dotted lines and boxed denote optional streams and units, respectively.

This description enables one skilled in the art to make and use the invention, and describes several embodiments, adaptations, variations, alternatives, and uses of the invention. These and other embodiments, features, and advantages of the present invention will become more apparent to those skilled in the art when taken with reference to the following detailed description of the invention in conjunction with any accompanying drawings.

As used in this specification and the appended claims, the singular forms "a," "an," and "the" include plural referents unless the context clearly indicates otherwise. Unless defined otherwise, all technical and scientific terms used herein have the same meaning as is commonly understood by one of ordinary skill in the art to which this invention belongs. All composition numbers and ranges based on percentages are weight percentages, unless indicated otherwise. All ranges of numbers or conditions are meant to encompass any specific value contained within the range, rounded to any suitable decimal point.

Unless otherwise indicated, all numbers expressing parameters, reaction conditions, concentrations of components, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phrase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phrase "consisting essentially of" limits the scope of a claim to the specified elements or method steps, plus those that do not materially affect the basis and novel characteristic(s) of the claimed subject matter.

With respect to the terms "comprising," "consisting of," and "consisting essentially of," where one of these three terms is used herein, the presently disclosed and claimed subject matter may include the use of either of the other two terms. Thus in some embodiments not otherwise explicitly recited, any instance of "comprising" may be replaced by "consisting of" or, alternatively, by "consisting essentially of."

Exemplary embodiments of the invention will now be described. These embodiments are not intended to limit the scope of the invention as claimed. Reference herein to first step, second step, etc. is for purposes of illustrating some embodiments only. Also, unless otherwise stated, the locations of steps or units may vary, at one or multiple sites. Also, it should be understood that all references to "embodiments" are non-limiting and are considered to also be options with respect to any other disclosed embodiment, unless the context clearly dictates otherwise. In the drawings, dotted lines denote optional unit operations or streams.

The present invention generally relates to processes and systems for producing masterbatches, such as composite elastomeric masterbatches for incorporation into rubber systems. In various embodiments, benefits of the invention include exceptional particulate dispersion within the masterbatch, energy efficiency, robust operability that minimizes process fouling and plugging, and the exclusion of a coagulating agent. The processes, systems, and principles of the invention are based on extensive laboratory and pilot-scale process development.

Masterbatch processes using aqueous polymer latex and particulates can provide uniform dispersion and better end-use performance in comparison to milling or simple extrusion. However, there are technical challenges associated with the processing, intimate mixing, dewatering, and drying of latex elastomers and particulates (in dry powder or aqueous slurry form) for uniform dispersion in end-use polymer products.

For example, in the case of nanocellulose and/or carbon black as particulates, the enhanced dispersion and reduction of agglomeration in rubber products significantly improve the beneficial properties of the particulates in the end-use product. A masterbatch with an exceptional pre-dispersion of particulates is required for optimal dispersion in the final material.

Several known challenges with masterbatch processing of latex slurries include agglomeration and rapid plugging/fouling during pumping and mixing, especially when multiple mixing steps are required for optimal dispersion or when multiple components are added to the slurry in a stepwise fashion.

Also, conventional latex masterbatch processing involves the use of a latex coagulant and separation of the macroscopic coagulant from the free water prior to drying. Disadvantages of coagulation include (a) the use of salts and acids whose residues are undesirable in end-use products and (b) detrimental impact on particulate dispersion between the latex particles upon agglomeration.

In this disclosure, a "polymer latex" means a stable, colloidal dispersion of polymer particles in a liquid, such as water. The polymer particles may be nanoparticles, microparticles, or a combination thereof. An aqueous polymer latex is a common embodiment in which polymer particles form a colloidal dispersion in water, or in a solution comprising water. In other embodiments, a polymer latex forms a colloidal dispersion in an organic solvent or an inorganic solvent other than water.

One example of a polymer latex is natural rubber latex, which is a naturally occurring colloidal dispersion of cis-poly(isoprene) in a water-rich liquid. In addition to cis-poly(isoprene) particles and water, there are small amounts of protein, sterol glycosides, resins, ash, and sugars in natural rubber latex, unless it is purified.

In some variations, the invention provides a process for making a particulate masterbatch, the process comprising:

(a) providing a plurality of particulates;
(b) optionally introducing the plurality of particulates and a pH-adjusting agent to a first mixing unit;
(c) conveying an aqueous polymer latex and the plurality of particulates from step (a) or from step (b), if conducted, to a second mixing unit, thereby generating a particulate-latex mixture comprising water;
(d) optionally conveying the particulate-latex mixture and a first process additive to a third mixing unit;
(e) conveying the particulate-latex mixture to a homogenizer, thereby generating a homogenized particulate-latex mixture;
(f) optionally (but preferably) conveying the homogenized particulate-latex mixture to a centrifuge to remove a first portion of the water, thereby generating a dewatered and homogenized particulate-latex mixture; and
(g) conveying the dewatered and homogenized particulate-latex mixture (or, if step (f) is not conducted, the homogenized particulate-latex mixture from step (e)) to a screw mixer, wherein the screw mixer is configured to remove a second portion of the water, thereby generating a particulate masterbatch, wherein steps (a), (c), (e), (f), and (g) are substantially conducted sequentially.

When step (b) but not step (d) is included in the process, preferably steps (a)-(c) and then (e)-(g) are substantially conducted sequentially (with step (f) optionally omitted). When step (d) but not step (b) is included in the process, preferably step (a) and then steps (c)-(g) are substantially conducted sequentially. When both steps (b) and (d) are included in the process, preferably steps (a)-(g) are substantially conducted sequentially. By "substantially conducted sequentially" in this disclosure, it is meant that the primary process flow is sequential so that the steps are conducted in order, it being understood that there may be various recycle streams, purge streams, additive streams, and so on.

Static inline mixers are preferentially utilized rather than other mixing devices including inline rotor-stator mixers, to prevent polymer latex agglomeration and minimize equipment cost. In some embodiments, at least one of the first mixing unit, the second mixing unit, and the third mixing unit is a static inline mixer. In certain embodiments, at least two of the first mixing unit, the second mixing unit, and the third mixing unit is a static inline mixer. In preferred embodiments, each of the first mixing unit, the second mixing unit, and the third mixing unit is a static inline mixer. In preferred embodiments, whether or not steps (b) and (d) are employed, the second mixing unit utilized in step (c) is a static inline mixer.

There may be an additional static inline mixer upstream of the first mixing unit in step (b), or upstream of the second mixing unit in step (c), to mix multiple types of particulates. In some embodiments, the plurality of particulates is first introduced to a pre-mixing unit (i) prior to step (b), if conducted, or (ii) prior to step (c). The pre-mixing unit may be a static inline pre-mixer or another type of mixing unit.

Figure 2:
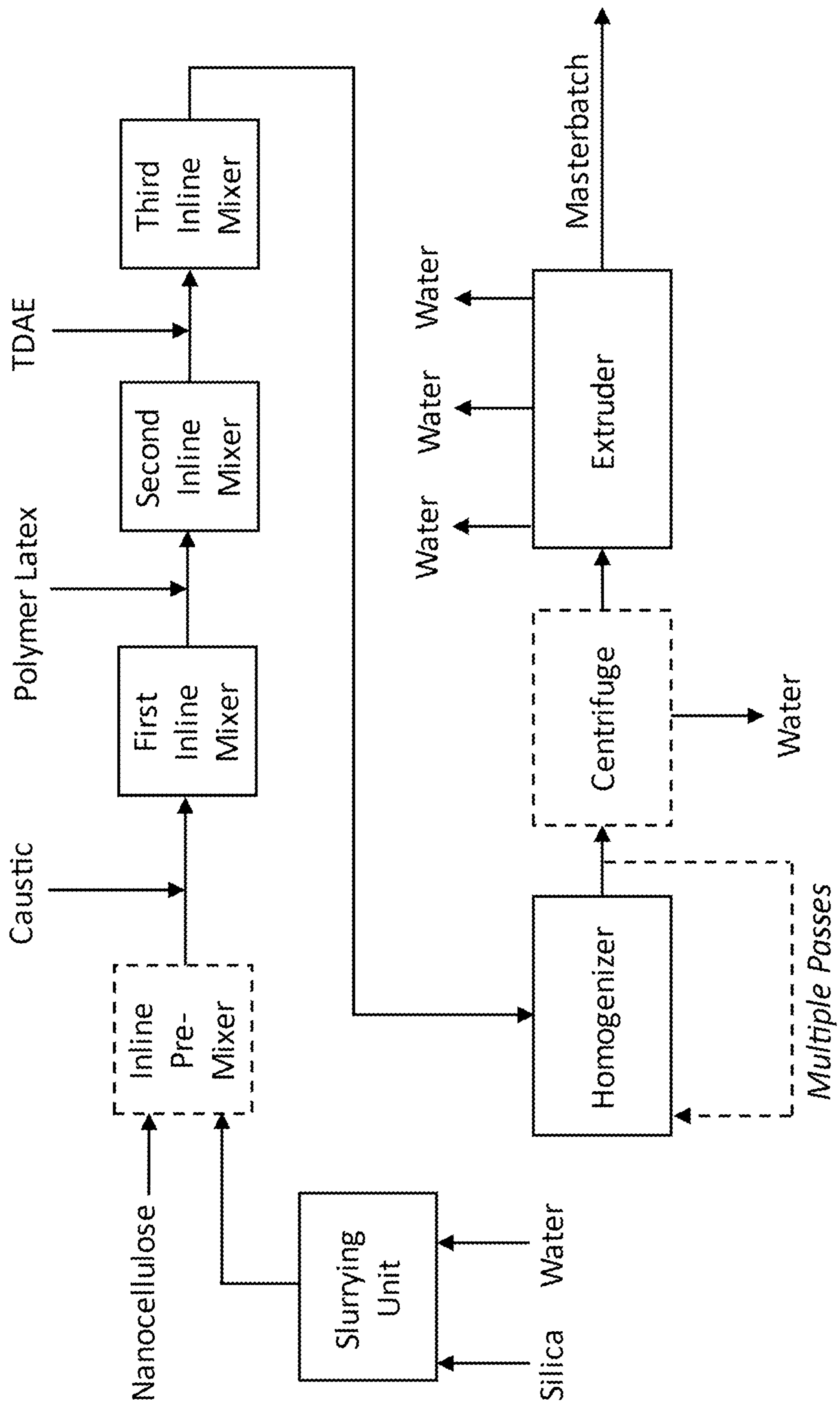
FIG. 2 is an exemplary block-flow diagram depicting processes and systems of the invention, in certain embodiments using polymer latex. Dotted lines and boxed denote optional streams and units, respectively.

As noted in FIGS. 1 and 2, the particulates may first be slurried prior to feeding the particulates to the first mixing unit. Slurrying may be done using water (which is typical), an aqueous liquid, a non-aqueous liquid, or a combination thereof. The slurrying unit may be, but not limited to, a simple vessel or tank with agitator, homogenizer, batch or inline rotor-stator mixer, kneader mixer, co-rotating or counter-rotating paddle shafts mixer, inline tube static mixer, eductor mixer, etc.

A variety of particulates may be used to produce the particulate masterbatch. Exemplary particulates include, but are by no means limited to, nanocellulose, carbon black, carbon fibers, graphite, activated carbon, biochar, pyrolyzed biomass, lignin-derived carbon, lignin, silica, alumina, clay, nano-clay, ceramics, polymer-derived ceramics, glass fibers, zeolites, cellulose fibers, polymer fibers, pyrolyzed polymers, graphene, carbon nanotubes, and nanodiamonds.

The particulates may be fed to the process as a fine powder (which may be a dry powder or a wet powder), as fibers, as pellets, as a slurry in a solvent or liquid carrier (e.g., water), or a combination thereof. When the particulates are fed as a slurry, the particulates may be about, least about, or at most about 1, 5, 10, 15, 20, 25, 30, 40, 50, 60, 70, 80, 90, 95, 99, 99.5, or 99.9 wt % solids (particulates), including any intervening ranges.

The particulates may be characterized by an average particle size from about 1 nanometer to about 100 microns, for example. For non-spherical particles, the average particle size is the average effective diameter of the particles. In various embodiments, the particulates are characterized by an average particle size of about, at least about, or at most about 1 nm, 5 nm, 10 nm, 15 nm, 20 nm, 25 nm, 50 nm, 75 nm, 100 nm, 200 nm, 300 nm, 400 nm, 500 nm, 600 nm, 700 nm, 800 nm, 900 nm, 1 μm, 2 μm, 3 μm, 4 μm, 5 μm, 10 μm, 15 μm, 20 μm, 25 μm, 30 μm, 40 μm, 50 μm, 60 μm, 70 μm, 80 μm, 90 μm, or 100 μm, including any intervening ranges.

Particle sizes may be measured by a variety of techniques, including dynamic light scattering, laser diffraction, image analysis, or sieve separation, for example. Dynamic light scattering is a non-invasive, well-established technique for measuring the size and size distribution of particles typically in the submicron region, and with the latest technology down to 1 nanometer. Laser diffraction is a widely used particle-sizing technique for materials ranging from hundreds of nanometers up to several millimeters in size. Exemplary dynamic light scattering instruments and laser diffraction instruments for measuring particle sizes are available from Malvern Instruments Ltd., Worcestershire, UK. Image analysis to estimate particle sizes and distributions can be done directly on photomicrographs, scanning electron micrographs, or other images. Finally, sieving is a conventional technique of separating particles by size.

The particulates may have virtually any shape, including spheres, cubes, polygons, rods, needles, fibers, plates, sheets, or random geometries.

The particulates are in a solid phase when fed to the masterbatch process, and the particulates are in a solid phase in the masterbatch product. In principle, some degree of particulate melting, softening, or dissolution may occur in the process, such as in an extruder.

The solid and liquid content of the polymer latex may vary widely, such as from about 10 wt % liquid to about 99.9 wt % liquid. In various embodiments, the polymer latex is about, at least about, or at most about 10, 15, 20, 25, 30, 40, 50, 60, 70, 80, 90, 95, 99, 99.5, or 99.9 wt % liquid (e.g., water), including any intervening ranges.

The pH-adjusting agent (referred to as "pH agent" in FIG. 1) may vary, depending on the desired pH in the masterbatch process. The pH-adjusting agent may be an acid, a base, a salt, or a buffer, for example. In one exemplary embodiment, the pH-adjusting agent is sodium hydroxide.

Optional process additives may be added at any point in the process, in one or more steps. The process additive may be a solvent, a carrier, an acid, a base, a buffer, a stabilizer, a surfactant, an emulsifier, a compatibilizer, an antioxidant, a flame retardant, a nucleating agent, a pesticide, a herbicide, a bacterial disinfectant, a virus inactivation agent, a density modifier, viscosity modifier, a colorant, a texturant, a diluent, a filler, a different type of particulate (i.e. different than the feed particulates), or a combination thereof. FIGS. 1 and 2 depict a process additive being introduced to the third mixing unit. A process additive may be added anywhere else, including to the starting particulates or to the final masterbatch product. In one example, a compatibilizer is added to a screw mixer or upstream of a screw mixer.

Exemplary process additives are treated distillate aromatic extract (TDAE) oil, distillate aromatic extract (DAE) oil, mild extraction solvates (MES), residual aromatic extract (RAE), residual aromatic extract (TRAE), naphthenic plasticizers (NAP), or a combination thereof. In FIG. 2, TDAE is a process additive added to the third inline mixer, for example.

Figure 3:
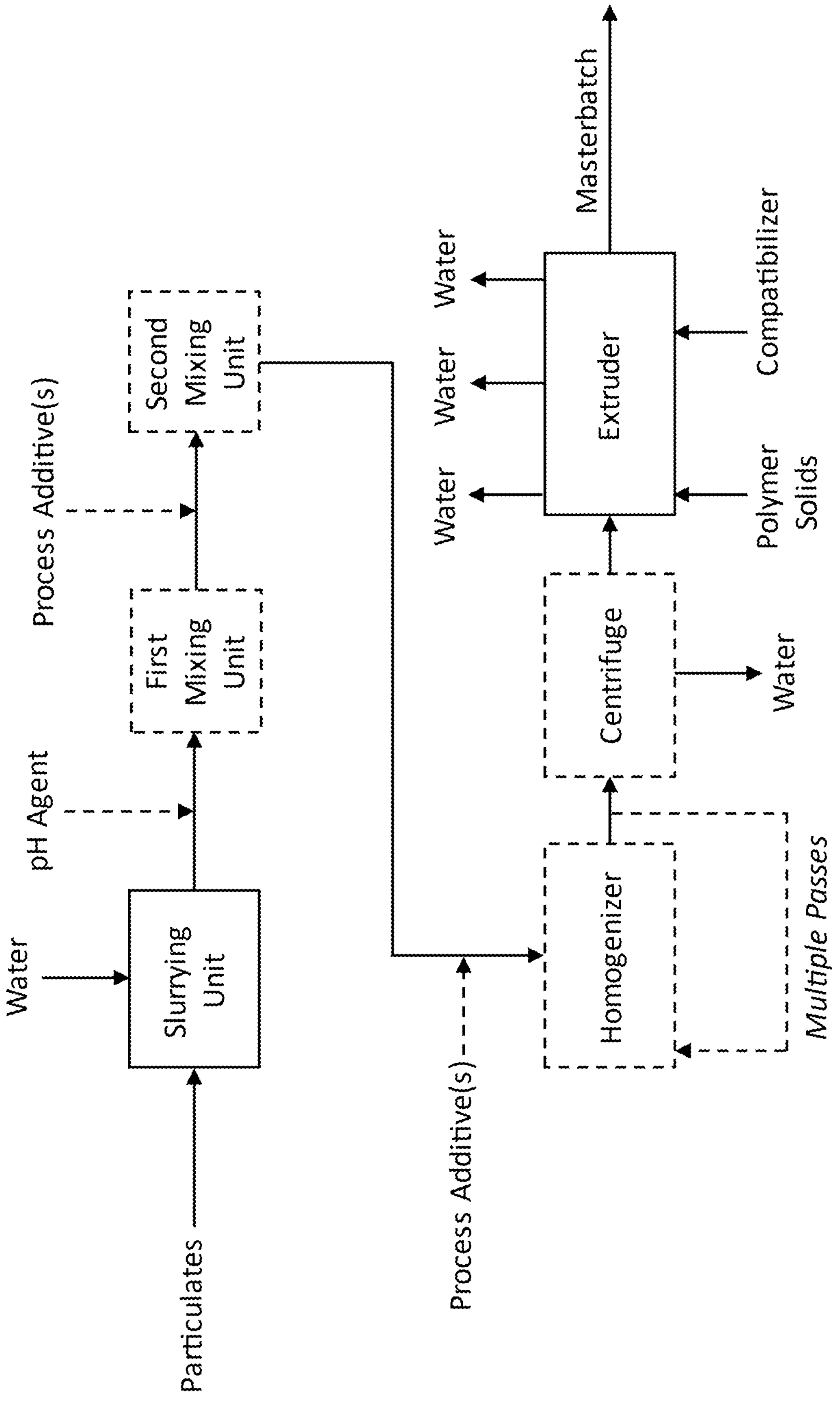
FIG. 3 is an exemplary block-flow diagram depicting processes and systems of the invention, in certain embodiments using polymer solids. Dotted lines and boxed denote optional streams and units, respectively.

A homogenizer is used to obtain intimate mixing of the aqueous mixture of latex and particulates for optimal predispersion in the masterbatch and consequent dispersion in the end-use product. A "homogenizer" utilizes mechanical forces, such as by shearing a material through small openings under high pressure. The homogenizer may reduce the particle size of the polymer (in the polymer latex), to achieve better dispersion. In certain embodiments, the homogenizer also may reduce the size of the particulates. Multiple passes through a homogenizer may be used, such as is depicted in FIGS. 1, 2, and 3 (optional), to achieve a desired particle size and/or dispersion index of the masterbatch.

In some embodiments, step (f) utilizes preheating of the homogenized particulate-latex mixture to enhance water removal. Generally, it is preferable for step (f) to utilize heating to enhance water removal from the centrifuge.

A centrifuge is preferably included in the process. It is possible to omit the centrifuge and convey the homogenized material directly to the screw mixer, but generally the energy requirements and therefore operating costs are much higher.

In some embodiments, the centrifuge is a decanter centrifuge configured to remove a first portion of the water, thereby generating a dewatered and homogenized particulate-latex mixture. A continuous decanter centrifuge with feed preheating is preferentially employed to dewater the combined components to a relatively high solids content, such as from about 10 wt % solids to about 50 wt %, e.g. from about 30 wt % solids to about 40 wt % solids. The configuration of a decanter centrifuge upstream of an extruder (or other screw mixer) limits the energy required to thermally remove water in the extruder.

In some embodiments, the screw mixer is a screw extruder, such as (but not limited to) a twin-screw extruder. A twin-screw extruder may be configured with a plurality of extruder zones with independently controlled temperatures, and/or a plurality of vacuum vents for enhanced removal of the second portion of water, and/or one or more side feeders for adding chemicals such as process additives. In some embodiments, the screw mixer is a twin-rotor mixer.

In certain embodiments, a twin-screw extruder contains a plurality of extruder zones in which the temperature of each of the zones is controlled independently for optimal thermal dewatering. Multiple vacuum vents may be located along the length of the extruder to release water vapor. FIGS. 1 and 2 imply three vacuum vents, but there may be 0, 1, 2, 3, 4, 5, or more vacuum vents. The vacuum vents may be configured with stuffing screws to prevent solids removal with the water vapor. The individual segments of the extruder screws are preferably designed for dewatering/vapor removal, shear, and conveying.

In some embodiments, a twin-screw extruder includes a single side feeder for adding chemicals such as process additives (e.g., compatibilizers). In certain embodiments, a twin-screw extruder contains a plurality of side feeders for adding chemicals such as process additives, which may be the same at each side feeder or may be different at different side feeders. Multiple side feeders may be located along the length of the extruder to add chemicals. The side feeders are typically different ports than the vacuum vents discussed in the preceding paragraph.

When the screw mixer is a screw extruder, the extruder's outlet die may be designed according to the desired physical form of the masterbatch. Exemplary masterbatch forms include, but are not limited to, pellets, prills, strands, crumb, or thin sheets or slabs, for example.

In preferred embodiments, the process does not employ a polymer latex coagulating agent. Examples of polymer latex coagulating agents include organic acids, such as citric acid, acetic acid, formic acid, or glycolic acid; inorganic acids, such as sulfuric acid, nitric acid, phosphoric acid, hydrochloric acid; and/or salts of any of the foregoing.

In preferred embodiments, the process avoids coagulation of the polymer latex. One skilled in the art will comprehend the importance of pump selection, piping configuration, and order of addition of components to prevent latex agglomeration. By avoiding latex coagulation, the polymer and the particulates remain better dispersed.

The plurality of particulates may include biomass-derived particulates selected from the group consisting of cellulose, nanocellulose, hemicellulose, nanohemicellulose, lignin, nanolignin, nanolignocellulose, and combinations thereof, for example. Nanocellulose is described in detail later in this specification. Nanolignin refers to lignin with a particle size of 1000 nanometers or less. Nanohemicellulose refers to hemicellulose oligomers with a particle size of 1000 nanometers or less.

The plurality of particulates may include particulates selected from the group consisting of silica, alumina, clay, nano-clay, zeolites, ceramics (e.g., silicon carbide), minerals (e.g., calcium carbonate, wollastonite, mica, kaolin, bentonite, biotite, or illite), metals (e.g., nickel), metal alloys (e.g., aluminum alloys), metal oxides (e.g., iron oxide), glass (e.g., glass fibers or glass beads), polymers (e.g., polymer fibers), pyrolyzed polymers (e.g., pyrolyzed waste PET), polymer-derived ceramics (via pyrolysis of preceramic polymers), and combinations thereof, for example.

The plurality of particulates may include carbonaceous particulates selected from the group consisting of carbon black, graphite, graphene, activated carbon, carbon nanotubes, carbon fibers, biochar, coke, nanodiamonds, and combinations thereof, for example.

In some embodiments, the particulates include, or consist essentially of, nanocellulose. In other embodiments, the particulates do not include nanocellulose. Later in this specification, nanocellulose is described in detail.

In some embodiments, the particulates include, or consist essentially of, carbon black. In other embodiments, the particulates do not include carbon black. Carbon black is a commercial form of solid carbon that is manufactured in highly controlled processes to produce specifically engineered aggregates of carbon particles that vary in particle size, aggregate size, shape, porosity, and surface chemistry. There are many known types of carbon black, including acetylene black, channel black, furnace black, lampblack, thermal black, recovered carbon black, graphitized carbon black, functionalized carbon black, and others.

In some embodiments, the particulates include, or consist essentially of, nanocellulose and carbon black. In other embodiments, the particulates include neither nanocellulose nor carbon black.

FIG. 2 shows an embodiment in which there are nanocellulose particulates as well as silica particulates. In FIG. 2, the silica may be slurried first with water, before adding the silica to the optional inline pre-mixer. The nanocellulose will typically be added in the form of an aqueous slurry. In certain embodiments, silica is slurried using a dilute slurry of nanocellulose, in which the excess water functions as a carrier for the silica. In such a variation, some or all of the nanocellulose would be added to the slurrying unit in FIG. 2.

In some processes, the particulate masterbatch is characterized by a dispersion index of at least 50, preferably at least 75, and more preferably at least 90. In various embodiments, the particulate masterbatch is characterized by a dispersion index of about, or at least about, 50, 55, 60, 65, 70, 75, 80, 85, 86, 87, 88, 89, 90, 91, 92, 93, 94, or 95, including any intervening ranges (e.g., 80-93).

There are a number of different techniques that may be used to measure or estimate the dispersion index, including light microscopy, profilometry, optical properties, electrical resistivity, reflectrometry, and others. A traditional technique to characterize particulate dispersion is the analysis of thin sections by light microscopy. See, for example, ASTM D2663 part B.5, which is incorporated by reference herein. The dispersion index may be calculated according to the equations described in Leigh-Dugmore, "Measurement of Dispersion in Black-Loaded Rubber", *RUBBER CHEM TECHNOL.* 29, 1303 (1956) and Medalia, "Dispersion of Carbon Black in Rubber: Revised Calculation Procedure", *RUBBER CHEM TECHNOL.* 34, 1134 (1961), with the understanding that the particulates are not necessarily carbon black but may be many other types of particulates.

The technique of interferometric microscopy may be used for dispersion characterization. Interferometric microscopy offers the advantages of being fast, simple, and quantitative. Interferometric microscopy utilizes the interference fringes between in-phase light beams reflected from the sample and a smooth reference surface to measure the three-dimensional surface topography. The peaks and valleys present on the fresh-cut surface are representative of the particulate agglomerates and are used to characterize the dispersion. A series of samples with different base particulate composites and varying dispersion levels may be created and characterized by both light microscopy and interferometric microscopy.

The process may be continuous, semi-continuous, batch, or semi-batch. Preferably, the process is substantially continuous.

FIG. 1 is an exemplary block-flow diagram depicting processes and systems of the invention, in some embodiments. Dotted lines and boxed denote optional streams and units, respectively. In FIG. 1, there is an optional slurrying unit for combining the particulates with water (or another solvent).

FIG. 2 is an exemplary block-flow diagram depicting processes and systems of the invention, in certain embodiments. Dotted lines and boxed denote optional streams and units, respectively. In FIG. 2, "caustic" refers to an alkaline additive that raises pH, wherein the alkaline additive may be sodium hydroxide or another alkaline additive. In FIG. 2, there is an optional slurrying unit for combining the silica particulates with water (or another solvent). The nanocellulose may also be fed to the same slurrying unit or another slurrying unit, if desired, or fed directly to the inline premixer (if present) or to the first inline mixer.

Note that the embodiments of FIGS. 1 and 2 indicate removal of water at several points in the process, predicated on the use of an aqueous polymer latex. In other embodiments, the polymer latex utilizes a liquid other than water, in which case "water" may be replaced with "liquid" in these diagrams. An example of a liquid other than water is ethanol or another alcohol.

In some variations, the invention provides a particulate masterbatch product produced by a process comprising:

(a) providing a plurality of particulates;

(b) optionally introducing the plurality of particulates and a pH-adjusting agent to a first mixing unit;

(c) conveying an aqueous polymer latex and the plurality of particulates from step (a) or from step (b), if conducted, to a second mixing unit, thereby generating a particulate-latex mixture comprising water;

(d) optionally conveying the particulate-latex mixture and a first process additive to a third mixing unit;

(e) conveying the particulate-latex mixture to a homogenizer, thereby generating a homogenized particulate-latex mixture;

(f) optionally conveying the homogenized particulate-latex mixture to a centrifuge to remove a first portion of the water, thereby generating a dewatered and homogenized particulate-latex mixture; and (g) conveying the dewatered and homogenized particulate-latex mixture (or, if step (f) is not conducted, the homogenized particulate-latex mixture from step (e)) to a screw mixer, wherein the screw mixer is configured to remove a second portion of the water, thereby generating a particulate masterbatch, wherein steps (a), (c), (e), (f), and (g) are substantially conducted sequentially.

The particulate masterbatch product may contain from about 0.1 wt % particulates to about 90 wt % particulates, for example. Typically, the particulate masterbatch product contains from about 10 wt % particulates to about 50 wt % particulates. In various embodiments, the particulate masterbatch product contains about, at least about, or at most about 1, 5, 10, 15, 20, 25, 30, 35, 40, 45, 50, 60, 70, 80, or 90 wt % particulates, including any intervening ranges.

The particulate masterbatch product may contain from about 10 wt % particulates to about 99.9 wt % of the polymer (from the starting polymer latex), for example. In various embodiments, the particulate masterbatch product contains about, at least about, or at most about 10, 15, 20, 25, 30, 35, 40, 45, 50, 60, 70, 80, 90, or 95 wt % polymer, including any intervening ranges.

The particulate masterbatch product may be completely dry or may contain some moisture (typically water but possibly other liquids). In various embodiments, the particulate masterbatch product contains about, or at most about, 0, 0.1, 0.2, 0.3, 0.4, 0.5, 1, 2, 3, 4, 5, 6, 7, 8, 9, or 10 wt % water, including any intervening ranges.

The particulate masterbatch product may be in the form of a dry powder, a wet powder, pellets, prills, strands, granules, crumb, chips, or thin sheets or slabs, for example. The extruder outlet (e.g., extruder die) may be designed for the intended masterbatch product form. There may be a milling device configured to generate a powder form of the particulate masterbatch product.

In certain embodiments, a liquid solvent is added to form a liquid masterbatch product, which may be desirable for certain applications. The liquid solvent may be a polar liquid solvent selected from the group consisting of water, $C_1$-$C_8$ alcohols, $C_2$-$C_8$ polyols, and combinations thereof, for example. Additionally, or alternatively, non-polar liquid solvents may be used, such as aromatic hydrocarbons, e.g. toluene, xylenes, or lignin derivatives.

In some variations, the invention provides a system for making a particulate masterbatch, the system configured to carry out a process comprising:

(a) providing a plurality of particulates;

(b) optionally introducing the plurality of particulates and a pH-adjusting agent to a first mixing unit;

(c) conveying an aqueous polymer latex and the plurality of particulates from step (a) or from step (b), if conducted, to a second mixing unit, thereby generating a particulate-latex mixture comprising water;

(d) optionally conveying the particulate-latex mixture and a first process additive to a third mixing unit;

(e) conveying the particulate-latex mixture to a homogenizer, thereby generating a homogenized particulate-latex mixture;

(f) optionally conveying the homogenized particulate-latex mixture to a centrifuge to remove a first portion of the water, thereby generating a dewatered and homogenized particulate-latex mixture; and (g) conveying the dewatered and homogenized particulate-latex mixture (or, if step (f) is not conducted, the homogenized particulate-latex mixture from step (e)) to a screw mixer, wherein the screw mixer is configured to remove a second portion of the water, thereby generating a particulate masterbatch, wherein steps (a), (c), (e), (f), and (g) are substantially conducted sequentially.

In some variations, the invention provides a system for making a particulate masterbatch, the system comprising:

(i) optionally, a first mixing unit configured for mixing a plurality of particulates and a pH-adjusting agent;

(ii) a second mixing unit in flow communication with the first mixing unit (if present), wherein the second mixing unit is configured for mixing the plurality of particulates and an aqueous polymer latex;

(iii) optionally, a third mixing unit in flow communication with the second mixing unit, wherein the third mixing unit is configured for mixing the particulate-latex mixture and one or more process additives;

(iv) a homogenizer in flow communication with the third mixing unit, if present, or the second mixing unit, wherein the homogenizer is configured to generate a homogenized particulate-latex mixture;

(v) optionally, a centrifuge in flow communication with the homogenizer, wherein the centrifuge is configured to remove a first portion of water, thereby generating a dewatered and homogenized particulate-latex mixture; and (vi) a screw mixer in flow communication with the centrifuge (or with the homogenizer if there is no centrifuge), wherein the screw mixer is configured to remove a second portion of water, thereby generating a particulate masterbatch; and (vii) an output for recovering the particulate masterbatch.

Other variations of the invention utilize polymer solids rather than polymer latex, or polymer solids in addition to polymer latex. In this specification, "polymer solids" means a substantially solid material that contains one or more polymers and is not in the form of a polymer emulsion, a polymer slurry, or a polymer dissolved in a solvent. By "substantially solid" it is meant that the polymer solids may contain up to 10 wt % water moisture and/or another liquid. Preferably, the polymer solids contains no more than 5 wt %, 4 wt %, 3 wt %, 2 wt %, 1 wt %, or 0.5 wt % water moisture and/or another liquid.

Polymer solids may contain any polymer described in this specification, including, but not limited to, polyethylene, polypropylene, polybutene, polyisobutylene, polybutadiene, polyisoprene, poly(ethylene-co-acrylic acid), poly(lactic acid) (or polylactide), poly(glycolic acid) (or polyglycolide), poly(hydroxybutyrate), poly(butylene adipate-co-terephthalate), poly(butylene succinate), poly(hydroxybutyrate-co-hydroxyvalerate), poly(ethylene terephthalate), polyvinyl alcohol, polystyrene, poly(butyl acrylate), poly(tert-butyl acrylate-co-ethyl acrylate-co-methacrylic acid), poly(ethyl acrylate), poly(2-ethylhexyl acrylate), poly(methyl acrylate), polyacrylonitrile, poly(acrylonitrile-co-methyl acrylate), poly(styrene-co-maleic anhydride), poly(methyl methacrylate), poly(alkyl methacrylate), polyvinylcyclohexane, poly(Bisphenol A carbonate), poly(propylene carbonate), poly(1,4-butylene adipate), poly(1,4-butylene succinate), poly(1,4-butylene terephthalate), poly(ethylene succinate), poly(vinyl acetate), poly(propylene glycol), poly(tetrahydrofuran), poly(ethyl vinyl ether), polydimethylsiloxane, nylons (aliphatic polyamides), and combinations or copolymers thereof. In preferred embodiments, the polymer solids contains natural rubber (polyisoprene), synthetic rubber (e.g., polyisobutylene, polyisoprene, polybutadiene, polychloroprene, styrene-butadiene rubber, etc.).

The polymer solids may be elastomers. Exemplary elastomers include natural rubber (e.g., natural latex non-vulcanized polyisoprene) and synthetic rubber. Natural rubber is mainly poly-cis-isoprene. Synthetic rubber is made from various petroleum-based or fermented-sugar monomers. The most prevalent synthetic rubbers are styrene-butadiene rubbers (SBR) derived from the copolymerization of styrene and 1,3-butadiene. Other synthetic rubbers are prepared from isoprene (2-methyl-1,3-butadiene, yielding polyisoprene); chloroprene (2-chloro-1,3-butadiene); and isobutylene (methylpropene), including a small percentage of isoprene for crosslinking when making butyl rubber.

The polymer solids, in addition to one or more polymers, may contain various additives and/or impurities. The additive may be one of the process additives desired for the process (e.g., a compatibilizer may be present within the polymer solids), or may be another additive, such as a polymerization aid used in the original process to make the polymer solids. Colorants or texturants may be used as a polymer-solids additive. Impurities may include, but are not limited to, dirt, dust, dyes, oils, monomers, oligomers, polymer-degradation products, metals, or combinations thereof.

The polymer solids may be virgin polymer, recycled polymer, or a combination thereof. In some embodiments, the polymer solids are natural rubber solids, which may be obtained by milling a natural rubber slab using a rubber granulator, for example. In some embodiments, the polymer solids are synthetic rubber solids, which may be obtained by drying the product from a polymerization reactor in the form of particles.

In certain embodiments, the polymer solids are recycled rubber crumb, such as produced from automotive and truck scrap tires. During the recycling process, steel and tire cord (fluff) may be removed, leaving tire rubber with a granular consistency. Continued processing with a granulator or cracker mill, optionally with the aid of cryogenics or by mechanical means, reduces the size of the particles further. The particles may be sized and classified based on various criteria such as color.

The particle size of the polymer solids may vary widely. In various embodiments, the average particle size of the polymer solids is selected from about 10 microns to about 7500 microns, such as from about 50 microns to about 5000 microns, or from about 100 microns to about 2500 microns. In various embodiments, the average particle size of the polymer solids is about, at least about, or at most about 10, 25, 50, 75, 100, 150, 200, 250, 300, 400, 500, 600, 700, 800, 900, 1000, 1500, 2000, 2500, 3000, 3500, 4000, 4500, 5000, 5500, 6000, 6500, 7000, or 7500 microns, including any intervening range.

The particle shape of the polymer solids may also vary. There may be substantially a single shape, or multiple shapes in the polymer solids. The shapes may be spherical, ovoidal, cubical, cylindrical, pyramidal, prismatic, high-aspect-ratio fibers, or random shapes, for example.

Some variations provide a process for making a particulate masterbatch, the process comprising:

(a) providing a plurality of particulates in the form of a particulate slurry comprising water;

(b) optionally, introducing the particulate slurry and a first process additive to a first mixing unit, wherein the first process additive comprises a pH-adjusting agent;

(c) optionally conveying the particulate slurry and a second process additive to a second mixing unit;

(d) optionally conveying the particulate slurry to a homogenizer;

(e) optionally conveying the particulate slurry to a centrifuge to remove a first portion of the water;

(f) conveying the particulate slurry, polymer solids, and optionally a third process additive to a screw mixer, wherein the screw mixer is configured to remove a second portion of the water, thereby generating a particulate masterbatch, wherein step (a), any optional steps (b) to (e), and step (f) are substantially conducted sequentially.

By "any optional steps (b) to (e)" being substantially conducted sequentially, it is meant that when a certain process step is included in the process, then the step is substantially sequential relative to earlier and later recited steps. For example, if step (d) is included, then step (d) is after step (a), after step (b) if included, after step (c) if included, before step (e) if included, and before step (f).

FIG. 3 is an exemplary block-flow diagram depicting processes and systems of the invention utilizing polymer solids, in some embodiments. Dotted lines and boxed denote optional streams and units, respectively. In FIG. 3, there is a slurrying unit for combining the particulates with water (or another solvent). After the pH-adjusting agent (labeled "pH Agent" in FIG. 3) is added, the stream enters a first mixing unit. If the pH-adjusting agent is not needed, e.g. because the pH is at the desired value from the slurrying unit, the first mixing unit may be omitted. The second mixing unit is optional but is preferred when one or more process additives are introduced upstream of the second mixing unit, as depicted in FIG. 3. In this process diagram, the homogenizer and centrifuge are both optional. The polymer solids are fed into the extruder, preferably into the feed inlet.

In FIG. 3, the compatibilizer is fed into the extruder, preferably into the feed inlet or into a side port. Feeding the compatibilizer into a side port is preferred so that there is less water contact with the compatibilizer within the extruder, thereby avoiding hydrolytic degradation of the compatibilizer in some embodiments. Some moisture-sensitive compatibilizers are preferably added to the last stage of the extruder after the water has been mostly or completely removed, to avoid degradation reactions caused by hot water. The compatibilizer and/or other process additives may be added upstream of the extruder, followed by in-line mixing, in addition to (or instead of) adding to the extruder.

In some embodiments, steps (c), (d), and (e) are conducted, and steps (a)-(f) are substantially conducted sequentially. In certain embodiments, one or two of steps (c), (d), and (e) are conducted, and all process steps are substantially conducted sequentially.

In some embodiments, the first mixing unit is a first static inline mixer. In these or other embodiments, the second mixing unit is a second static inline mixer.

In some embodiments, the plurality of particulates is first introduced to a pre-mixing unit prior to step (b). For example, the plurality of particulates may be slurried with water in the pre-mixing unit, which may be referred to as a slurrying unit when a slurry is formed.

In some embodiments employing step (e), the centrifuge is a decanter centrifuge.

The second process additive may be a compatibilizer for compatibilizing the particulates with the polymer solids. Alternatively, or additionally, the third process additive may be a compatibilizer for compatibilizing the particulates with the polymer solids. The third process additive may be conveyed directly to the screw mixer via an inlet port, or may be added to the input stream that is introduced to the screw mixer. Compatibilizers are discussed later in this specification.

In some embodiments, step (f) utilizes heating to enhance water removal from the screw mixer. Optionally, there is preheating in step (f), or prior to step (f), to preheat the particulate slurry to enhance water removal from the screw mixer.

In some embodiments, the screw mixer is a twin-screw extruder. The twin-screw extruder may be configured with a plurality of extruder zones with independently controlled temperatures, and a plurality of vacuum vents, for enhanced removal of the second portion of water. In other embodiments, the screw mixer is a twin-rotor mixer.

In some embodiments, the process is continuous or semi-continuous. In other embodiments, the process is batch or semi-batch.

The particulate masterbatch may be characterized by a dispersion index of at least 50, at least 75, or at least 90, for example. In various embodiments, the particulate masterbatch is characterized by a dispersion index of about, or at least about, 50, 55, 60, 65, 70, 75, 80, 85, 90, or 95, including any intervening range.

Preferably, the process utilizing polymer solids does not employ a polymer latex coagulating agent.

The plurality of particulates may contain at least two types of particulates, wherein at least one type of particulates is slurried prior to step (b).

In some embodiments, the plurality of particulates includes biomass-derived particulates selected from the group consisting of cellulose, nanocellulose, hemicellulose, nanohemicellulose, lignin, nanolignin, nanolignocellulose, and combinations thereof.

In some embodiments, the plurality of particulates includes particulates selected from the group consisting of silica, alumina, clay, nano-clay, zeolites, ceramics, metals, glass, polymers, and combinations thereof.

In some embodiments, the plurality of particulates includes carbonaceous particulates selected from the group consisting of carbon black, graphite, graphene, activated carbon, carbon nanotubes, carbon fibers, biochar, coke, nanodiamonds, and combinations thereof.

In certain embodiments, the particulates include nanocellulose. In various embodiments, the particulates do not include nanocellulose.

In certain embodiments, the particulates include carbon black. In various embodiments, the particulates do not include carbon black.

In certain embodiments, the particulates include nanocellulose and carbon black. In other embodiments, the particulates include neither nanocellulose nor carbon black.

In some variations, the invention provides a particulate masterbatch product produced by a process comprising:

(a) providing a plurality of particulates in the form of a particulate slurry comprising water;

(b) optionally, introducing the particulate slurry and a first process additive to a first mixing unit, wherein the first process additive comprises a pH-adjusting agent;

(c) optionally conveying the particulate slurry and a second process additive to a second mixing unit;

(d) optionally conveying the particulate slurry to a homogenizer;

(e) optionally conveying the particulate slurry to a centrifuge to remove a first portion of the water;

(f) conveying the particulate slurry, polymer solids, and optionally a third process additive to a screw mixer, wherein the screw mixer is configured to remove a second portion of the water, thereby generating a particulate masterbatch, wherein step (a), any optional steps (b) to (e), and step (f) are substantially conducted sequentially.

In some variations, the invention provides a system for making a particulate masterbatch, the system configured to carry out a process comprising:

(a) providing a plurality of particulates in the form of a particulate slurry comprising water;

(b) optionally introducing the particulate slurry and a first process additive to a first mixing unit, wherein the first process additive comprises a pH-adjusting agent;

(c) optionally conveying the particulate slurry and a second process additive to a second mixing unit;

(d) optionally conveying the particulate slurry to a homogenizer;

(e) optionally conveying the particulate slurry to a centrifuge to remove a first portion of the water;

(f) conveying the particulate slurry, polymer solids, and optionally a third process additive to a screw mixer, wherein the screw mixer is configured to remove a second portion of the water, thereby generating a particulate masterbatch, wherein step (a), any optional steps (b) to (e), and step (f) are substantially conducted sequentially.

In some variations, the invention provides a system for making a particulate masterbatch, the system comprising:

(i) optionally, a first mixing unit configured for mixing a plurality of particulates and a pH-adjusting agent (as first process additive);

(ii) optionally, a second mixing unit in flow communication with the first mixing unit, wherein the second mixing unit is configured for mixing the plurality of particulates with a second process additive;

(iii) optionally, a homogenizer in flow communication with the second mixing unit, if present, or the first mixing unit;

(iv) optionally, a centrifuge in flow communication with the homogenizer, if present, or the second mixing unit, if present, or the first mixing unit, wherein the centrifuge is configured to remove a first portion of water;

(v) a screw mixer in flow communication with the centrifuge (or with the homogenizer if the centrifuge is omitted, or the second mixing unit if the homogenizer is omitted, or the first mixing unit if the second mixing unit is omitted), wherein the screw mixer is configured to remove a second portion of water, thereby generating a particulate masterbatch; and (vi) an output for recovering the particulate masterbatch.

In this specification, all references to "matrix polymer" will be understood as exemplary references to "matrix material." Likewise, all references to "carrier polymer" will be understood as exemplary references to "carrier material." While many embodiments directed to polymers are described, this patent application is expressly not limited to use of the nanocellulose-dispersion concentrate in polymer systems.

The particulate masterbatch may be added to a matrix material to form a particulate composite (end-use application). The matrix material may be a matrix polymer. For example, the matrix polymer may be selected from the group consisting of polyolefins, polyols, polyesters, polyamides, polylactide, polystyrene, polycarbonates, polyacrylates, polystyrenes, styrenic rubbers, natural rubbers, synthetic rubbers, polyurethanes, polyureas, poly(amide-enamine)s, polyanhydrides, polyhydroxyalkanoates, poly(alkene dicarboxylate)s, silicones, thermoplastic elastomers, thermoplastic polyurethanes (TPU), synthetic rubber, natural rubber, carbonaceous polymers, and combinations or co-polymers thereof.

Alternatively, or additionally, the matrix material may be a material other than a polymer, such as a material selected from the group consisting of paper, paperboard, fiber and wood composites (e.g., particleboard and molded pulp products), emulsions, hydrogels, carbon, organic solids, inorganic solids, oils, organic liquids, inorganic liquids, cementitious materials (e.g., concrete or cement), minerals, ceramics, metals, metal alloys, glass, and combinations thereof. A non-polymer matrix material may be an adhesive matrix, a battery electrode matrix, a bioink matrix, an electronic ink matrix, or an asphalt matrix, for example.

In some embodiments, the matrix material includes a polymer selected from polyesters, polyolefins, polyamides, polystyrenes, styrenic rubbers, natural rubbers, synthetic rubbers, polyurethanes, polyureas, poly(amide-enamine)s, polyanhydrides, polyacrylates, polyhydroxyalkanoates, poly (alkene dicarboxylate)s, silicones, thermoplastic elastomers, thermoplastic polyurethane (TPU), synthetic rubber, natural rubber, or combinations or copolymers thereof. Some polymer blends include polylactide, polyhydroxyalkanoates, aliphatic-aromatic copolyesters, both polylactide and aliphatic-aromatic copolyesters, polyethylene and/or polypropylene.

In various embodiments, a polymer is selected from the group consisting of polyethylene, polypropylene, polybutene, polyisobutylene, polybutadiene, polyisoprene, poly (ethylene-co-acrylic acid), poly(lactic acid) (or polylactide), poly(glycolic acid) (or polyglycolide), poly(hydroxybutyrate), poly(butylene adipate-co-terephthalate), poly(butylene succinate), poly(hydroxybutyrate-co-hydroxyvalerate), poly(ethylene terephthalate), polyvinyl alcohol, polystyrene, poly(butyl acrylate), poly(tert-butyl acrylate-co-ethyl acrylate-co-methacrylic acid), poly(ethyl acrylate), poly(2-ethylhexyl acrylate), poly(methyl acrylate), polyacrylonitrile, poly(acrylonitrile-co-methyl acrylate), poly(styrene-co-maleic anhydride), poly(methyl methacrylate), poly(alkyl methacrylate), polyvinylcyclohexane, poly(Bisphenol A carbonate), poly(propylene carbonate), poly(1,4-butylene adipate), poly(1,4-butylene succinate), poly(1,4-butylene terephthalate), poly(ethylene succinate), poly(vinyl acetate), poly(propylene glycol), poly(tetrahydrofuran), poly(ethyl vinyl ether), polydimethylsiloxane, nylons (aliphatic polyamides), and combinations or copolymers thereof. Carbonaceous polymers may also be incorporated in the composites. Examples of carbonaceous polymers include polyacenaphthylene, graphite, graphene, carbon fibers, lignin, and asphalt.

Polymers that may be included in the particulate composite may be hydrophobic, partially hydrophobic, or oleophilic, for example. Hydrophilic polymers may be modified to render them at least partially hydrophobic, with suitable coatings or combinations of components (e.g., interpenetrating networks of polymers).

Polymers or copolymers may be produced by polymerizing one or more monomers selected from the group consisting of acrylics, amides, carbon, carbonates, dienes, esters, ethers, fluorocarbons, imides, olefins, organic acids (e.g., lactic acid, glycolic acid, succinic acid, hydroxypropionic acid, etc.), styrenes, siloxanes, vinyl acetals, vinyl and vinylidene chlorides, vinyl esters, vinyl ethers, vinyl ketones, vinylpyridine, vinylpyrrolidone, and combinations thereof.

A polymer in a particulate composite may comprise a thermoplastic polymer, a thermoset polymer, or a combination of these. Thermoset polymers include, but are not limited to, polyurethanes, polyesters, polyureas, polyisoprenes (including natural rubber or synthetic rubber), phenol-formaldehyde resins, polyepoxides, polyimides, polycyanurates, polyfurans, silicones, and combinations or co-polymers thereof.

In some embodiments, a matrix polymer is specifically an elastomer. Exemplary elastomers include natural rubber (e.g., natural latex non-vulcanized polyisoprene) and synthetic rubber. Natural rubber is mainly poly-cis-isoprene. Synthetic rubber is made from various petroleum-based or fermented-sugar monomers.

The most prevalent synthetic rubbers are styrene-butadiene rubbers (SBR) derived from the copolymerization of styrene and 1,3-butadiene. Other synthetic rubbers are prepared from isoprene (2-methyl-1,3-butadiene, yielding polyisoprene); chloroprene (2-chloro-1,3-butadiene); and isobutylene (methylpropene), including a small percentage of isoprene for crosslinking when making butyl rubber.

In some embodiments, a matrix polymer is bio-based, biodegradable, and/or compostable. In these or other embodiments, the carrier polymer is bio-based, biodegradable, and/or compostable. In some embodiments, the matrix polymer or carrier polymer is or includes a biodegradable polymer, such as any polymer described in Vroman and Tighzert, "Biodegradable Polymers", *Materials* 2009, 2, 307-344, which is hereby incorporated by reference herein. In some embodiments, a nanocellulose-containing composite product has at least 50%, 60%, 70%, 80%, 90%, 95%, or 100% renewable carbon content, as measurable by $^{13}C$ analysis, for example.

Many types of composite products are possible, including films, coatings, packaging, utensils, fibers, fabrics, apparel, durable goods, nonwovens, and so on. The composite product may be in the form of a pellet, extruded part, injection-molded part, blow-molded part, spun fiber, layered sheet, film, foam, container, bag, engineered part, 3D-printing substrate, 3D-printed part, or a combination thereof, for example.

Nanocellulose will now be further described. As explained earlier, nanocellulose is a type of particulate that may be used to make a masterbatch, it being understood that the present invention is applicable well beyond nanocellulose.

Nanocellulose has gained prominence as a nanostructured material. Nanocellulose features biodegradability and environmental sustainability since it is derived from a naturally occurring resource, cellulose—which is the most abundant polymer on earth. In addition, nanocellulose offers tremendous technical potential to improve the mechanical strength and other properties of composites, regardless of the social and environmental sustainability of nanocellulose. Nanocellulose is composed of parallel linear polysaccharide molecules. Nanocellulose has attractive physicochemical properties, such as extraordinarily high stiffness and strength, alongside its abundance and sustainability.

Nanocellulose is being developed for use in a wide variety of applications such as polymer reinforcement, anti-microbial films, biodegradable food packaging, printing papers, pigments and inks, paper and board packaging, barrier films, adhesives, biocomposites, wound healing, pharmaceuticals and drug delivery, textiles, water-soluble polymers, construction materials, recyclable interior and structural components for the transportation industry, rheology modifiers, low-calorie food additives, cosmetics thickeners, pharmaceutical tablet binders, bioactive paper, pickering stabilizers for emulsion and particle stabilized foams, paint formulations, films for optical switching, and detergents.

However, there remains a serious technical challenge associated with widespread use of nanocellulose. In particular, removing water from nanocellulose suspensions to maintain nanoscale dimensions is very difficult. In most cases, nanocellulose particles are processed as aqueous suspensions because of their hydrophilic nature and propensity to agglomerate during drying. There is an industrial need to develop robust dispersion and drying processes which will maintain nanoscale dimensions for materials applications where a dry form is necessary. Drier forms of nanocellulose also mitigate high transportation costs of dilute aqueous suspensions and expand the number of end-use applications that have limitations on the amount of water that can be added to the product.

In the case of both cellulose nanocrystals as well as cellulose nanofibrils (or microfibrils), the dispersibility of nanocellulose in non-aqueous-based polymers and other systems has remained problematic, as they typically require dried forms of nanocellulose for incorporation. Nanocellulose tends to irreversibly bond to itself during drying, resulting in large agglomerates of nanocellulose. The large agglomerates often impede or even destroy the intended property benefit for the polymer composite or other system into which the nanocellulose particles are being introduced. For example, well-dispersed nanocellulose particles in polymers can result in significant mechanical strength enhancement. When the nanocellulose becomes agglomerated, however, there may be no mechanical strength enhancement at all—or even worse, large agglomerates can result in stress concentrators that can cause premature failure of a polymer part.

In terms of improving nanocellulose dispersion in non-aqueous-based products, various drying approaches have been tried. These approaches usually require extreme measures that would prove difficult to scale-up to commercial quantities, and are therefore uneconomical. Generally, these methods are based on lyophilization (freeze drying) of nanocellulose, which is the established, laboratory method for preventing irreversible inter-particle bonding of nanocellulose. Freeze-drying is not economical nor scalable for commercial production of nanocellulose.

For practically all non-aqueous applications in which nanocellulose is used, improving its dispersion and thus the utility and benefit to these applications has been a major hurdle for implementation of nanocellulose. Thus, it has become important to improve nanocellulose dispersion using economical methods that make the nanocellulose highly dispersible in polymers and other systems. Economical methods usually entail a dried composition containing nanocellulose. A dried form of nanocellulose is especially important in the field of thermoplastic processing such as extrusion and injection molding, in which thermal melting processes are encountered. During thermal melting processes with non-polar thermoplastics, water is a detriment to satisfactory processing.

Dewatering, or concentrating, nanocellulose slurries for more efficient shipping or use in water-limited applications is inherently difficult because of the high water-holding capacity and high viscosity of these materials at low concentrations. For aqueous-based applications, end users require nanocellulose "concentrates" with as high solids content as possible, while being rapidly redispersible with low-energy, standard mixing equipment. Depending on the application, nanocellulose may require redispersion in water such that the unique and purposely engineered nanoscale properties are retained.

The polymer latex may function as a dispersion/drying agent for nanocellulose (or other particulates). In some variations, dewatering and drying aqueous nanocellulose slurries utilizes a twin-screw system (e.g., a twin-screw extruder) configured to allow release of water vapor. The dispersion/drying agent is added to the nanocellulose slurry which is eventually dewatered in a twin-screw system. A twin-screw system with one or more system vents works surprisingly well to dewater a nanocellulose slurry. As water is removed from the system vent(s), the dispersion/drying agent prevents the nanocellulose from agglomerating and irreversibly bonding with itself.

As explained earlier, it is often desirable for composite products to incorporate distinct nanocellulose particles and prevent those particles from bonding together (agglomerating) during production or use. Nanocellulose is typically available as an aqueous dispersion, as produced from cellulosic biomass or through bacterial synthesis. In dilute aqueous dispersions, the nanocellulose particles remain non-agglomerated or reversibly agglomerated. For most polymer systems, for example, the aqueous dispersion itself cannot be introduced into a polymer matrix—the water needs to first be removed. Even for aqueous systems, additive products containing as little water as possible are preferred to minimize product delivery costs and the amount of water introduced to the end-use product system with the additive. It is generally unacceptable to introduce excess water into a product system along with the additive such that the product must then be dewatered or dried beyond normal levels.

The dry or dewatered (concentrated) form of the masterbatch may be incorporated in a wide range of plastics, elastomers, and adhesives, as well as non-polymer matrices including electronic inks, sealants, and other non-water-based applications.

A "dispersion/drying agent" as intended herein is a chemical, or combination of chemicals, that functions to prevent irreversible agglomeration of nanocellulose while it is being dried or dewatered. The dispersion/drying agent disclosed herein is selected to retain distinct nanocellulose particles by preventing bonding between nanocellulose particles while the aqueous dispersion is being dried or dewatered (water removal). Without an effective dispersion/drying agent, irreversible bonding between nanocellulose particles has been observed through drying with heat to as low as about 20 wt % solids slurries. The dispersion/drying agent also retains distinct nanocellulose particles while the nanocellulose is being incorporated into a masterbatch product, and effectively and easily releases the individual nanocellulose particles during composite product formulating so that the effectiveness of the nanocellulose is maximized. To reduce or prevent nanocellulose from bonding to itself during drying or dewatering, a dispersion/drying agent may be selected to interact sufficiently with the surface of the nanocellulose and/or distribute uniformly between nanocellulose particles, thereby reducing or preventing nanocellulose agglomeration.

In this patent application, "dewatering" means removal of liquid water from a nanocellulose slurry. "Drying" typically refers to a relatively high extent of dewatering, up to and including the removal of all water from the nanocellulose, using thermal energy.

In the specification, a "nanocellulose-dispersion concentrate" refers to a composition containing at least nanocellulose and a dispersion/drying agent. "Dewatered nanocellulose," "dried nanocellulose," "dewatered nanocellulose slurries," and the like refer to compositions containing nanocellulose and optionally containing a dispersion/drying agent.

Pre-concentrating in a centrifuge using mechanical separation is advantageous to reduce the overall volume being fed to the twin-screw extruder (or other screw mixer), which gives a higher capacity on a nanocellulose basis. Mechanical separation means that separation is achieved using mechanical forces such as centrifugal or centripetal forces, or possibly physical forces such as pressure causing water permeation through filtration media or a membrane. An exemplary centrifuge is a decanter centrifuge employing high-speed rotation with centrifugal forces to separate nanocellulose, which has a higher density that that of water, from the water which is continuously removed (decanted). An exemplary filtration device is a pressure filter employing high-pressure air (or another inert gas) to create a mat of nanocellulose and a water-rich filtrate. Filtration devices include filter presses, belt presses, and the like.

An extruder feed sub-system may essentially consist of a traditional hopper feeding system. Hoppers are well-known for feeding moist solids to extruders. If the moist solids are not a free-flowing material, the hopper may be designed with a rotating agitator and/or wiping blade, or with hopper vibration, to prevent bridging of feed material.

As intended herein, a “twin-screw system” is a machine that utilizes at least two solid screws or rotors that rotate (radially) with preferably small gaps between the screws or rotors, imparting significant shear forces onto a material being processed. In the present case of the material being a nanocellulose (or other particulate) slurry, the high shear and preferably small gaps create a thin material layer with high surface area that is exposed for vaporization of water. The high shear forces enable intimate mixing of the nanocellulose slurry with the polymer latex. Also, in some cases, as water is released, the intimate mixing provided by the twin screws or rotors leads to particle tumbling and grinding so that particle drying is relatively uniform.

The twin-screw system may be a continuous system, a semi-continuous system, a semi-batch system, or a batch system. When the twin-screw system is continuous or semi-continuous twin-screw extruder, material is continually conveyed axially through the system, from a feed sub-system to an extruder outlet, for some period of time. When the twin-screw system is a batch or semi-batch twin-rotor mixer, material is initially added to the system and then the system is typically closed, except for vents or water vapor removal, and then subjected to intimate mixing via high-shear forces caused by two rotors rotating radially with preferably small gaps between the rotors. After a period of time (batch time), the system is opened up and the processed material is recovered. In a semi-batch system, the system may be operated for a period of time and then material may be periodically added to, or withdrawn from, the system (e.g., water release may be intermittent, or dewatered nanocellulose may be periodically recovered through a valve). In the case of batch or semi-batch, the feed sub-system may be the vessel itself that may be initially loaded, and the system outlet may also be the vessel itself, following batch operation.

In the case of the twin-screw system being a twin-screw extruder, the solid screws are typically fabricated from metals or metal alloys, such as stainless steel, optionally with ceramic coatings, such as chromium carbide. A screw may be fabricated as a single piece or may be segmented and assembled on a shaft. The screws may be arranged parallel to each other, or in a conical arrangement in which the screw axes are not parallel to each other but rather converge along the length of the extruder.

A twin-screw extruder may be a co-rotating twin-screw extruder, a counter-rotating twin-screw extruder, or another type of twin-screw extruder (e.g., a gear pump extruder). When two screws are designed to rotate in the same radial direction (co-rotation), the twin screws are co-rotating screws. When two screws are designed to rotate in the opposite radial direction, the twin screws are counter-rotating screws. The flights of the screws may be designed such that two screws intermesh with each other (intermeshed screws) or do not fully intermesh with each other (non-intermeshed screws). The screws are contained within one or more barrels that form external walls around the screws, thereby containing the material during processing.

For continuous systems, a counter-rotating twin-screw extruder has beneficial material feed and conveying characteristics. The residence time and material temperature control in a counter-rotating twin-screw extruder are also relatively uniform. However, air entrapment, generation of high pressure, and low maximum screw speed may be disadvantages. The advantages of a co-rotating twin-screw extruder are that the screws wipe each other clean (self-wiping), and high screw speeds and high outputs may be realized, along with good mixing. Co-rotating twin-screw extruders may also be desirable for reduced screw and barrel wear.

For continuous systems, screws may be designed to incorporate different screw elements along the screw length. Such screw elements may include, but are not limited to, flighted elements, mixing elements, and zoning elements. Flighted elements forward material past barrel ports, through mixers, and out of the extruder through a die. Mixing elements facilitate the mixing of the various components being processed. Zoning elements isolate two operations. Some elements may be multifunctional.

For continuous systems, the mixing efficiency of a twin-screw extruder can be increased by incorporating many mixing elements along the screws. These and other elements may be slotted onto a central shaft to build up a screw section. Preferably, the length, number, and form of the elements may be easily changed. The elements may take various forms such as reversed screw flights, kneading discs, pins, rotors, slotted vanes, blister rings, etc. Mixing elements may be designed to cause extensional mixing and planar shear to be imparted into the materials being processed, to facilitate dispersive mixing. Mixing elements may be designed to result in divisions and recombinations of the stream, to facilitate distributive mixing.

For continuous systems, the outside screw diameter, inside screw diameter, and channel depth are important twin-screw extruder design parameters as these parameters dictate the available free volume and torque (and thus radial shear forces). As the channel depth increases, the inside screw diameter decreases and results in less attainable shaft torque.

Generally speaking, screw design will be tailored to the specific application (e.g., type of particulate, selection of polymer latex, extent of dewatering desired, throughput, etc.). A skilled artisan in twin-screw extruders will be able to customize screw design using known principles and calculations.

This specification hereby incorporates by reference Goff et al., *The Dynisco Extrusion Processors Handbook,* 2nd edition, 2000, for its teachings of the principles and design parameters of twin-screw extruders. This specification also hereby incorporates by reference Martin, “Twin Screw Extruders as Continuous Mixers for Thermal Processing: a Technical and Historical Perspective”, *AAPS PharmSciTech*, Vol. 17, No. 1, February 2016, for its teachings of various design and operation principles of twin-screw extruders.

Extruders employing three or more screws are within the scope of twin-screw extruders herein. In a three-screw extruder, all three screws may be co-rotating, or two screws may be co-rotating and one screw counter-rotating in relation to the radial direction of the other screws.

A gear pump extruder is a simple twin-screw extruder that moves a material through the action of two intermeshing gears, which are essentially screws or rotors with relatively short lengths. The gears are typically fabricated from metals or metal alloys, such as stainless steel, optionally with ceramic coatings, such as chromium carbide. When the two gears are designed to rotate in the same radial direction (co-rotation), the gear pump extruder is a co-rotating gear pump extruder. When the two gears are designed to rotate in the opposite radial direction, the gear pump extruder is a counter-rotating gear pump extruder. The flights of the gears may be designed such that the two gears intermesh with each other or do not fully intermesh with each other.

In some embodiments, the screw mixer is a gear pump extruder that is operated in batch rather than continuously. The intermeshing gears may be designed to co-rotate or counter-rotate, and the flights of the gears may be designed such that the two gears intermesh with each other or do not fully intermesh with each other. The gear pump extruder is initially loaded with the nanocellulose slurry and optionally a dispersion-drying agent. The batch gear pump is operated for a period of time (batch time) to allow intimate, high-shearing mixing and release of water vapor out of a vent.

In some embodiments, the screw mixer is a batch or semi-batch twin-rotor mixer. The twin-rotor mixer is configured with two rotors that may be intermeshing or non-intermeshing. The two rotors rotate (radially), imparting significant shear forces onto a material being processed. The high shear forces enable intimate mixing of the nanocellulose (or other particulate) slurry with the dispersion/drying agent. The rotors are typically fabricated from metals or metal alloys, such as stainless steel, optionally with ceramic coatings, such as chromium carbide. The two rotors may be designed to rotate in the same radial direction (co-rotation) or in the opposite radial direction (counter-rotation). In principle, such twin-rotor mixers may be scaled up to commercial scale.

A twin-rotor mixer contains a cavity (or mixing chamber) with vaned rotors, where vanes pump and intimately mix material in opposite directions. The rotors of a twin-rotor mixer may be designed such that the number, shape, and angles of the vanes are optimized for the particular application. Rotors generally have two or four flights, but other numbers of flights are possible. The rotors of a twin-rotor mixer may be selected from tangential rotors, roller rotors, delta rotors, cam rotors, Sigma rotors, Banbury rotors, or other industrially available rotors, for example. In some embodiments of twin-rotor mixers, two rotors rotate toward each other at slightly different speeds. Each rotor has a blade that extends along the length of the rotor roughly in the form of a spiral. Each rotor may be cored to permit cooling or heating by the passage of water or of an appropriate heating agent. An example of a commercial-scale two-wing rotor is the well-known Banbury design.

For batch or semi-batch systems, the mixing efficiency of a twin-rotor mixer can be increased by incorporating many mixing elements in the rotors. The rotor elements may take various forms. Rotor mixing elements may be designed to cause extensional mixing and planar shear to be imparted into the materials being processed, to facilitate dispersive mixing. Rotor mixing elements may be designed to result in divisions and recombinations of the stream, to facilitate distributive mixing. Generally speaking, rotor design will be tailored to the specific application (e.g., type of particulate, polymer latex, extent of dewatering desired, throughput, etc.). A skilled artisan in twin-rotor mixers will be able to customize rotor design using known principles and calculations.

The twin-screw system may be designed to operate with an average system temperature from about 120° C. to about 300° C., for example. The twin-screw system is preferably designed to operate with a maximum system temperature that is less than the thermal-decomposition onset temperature of the particulate being dewatered or dried and that is preferably less than the thermal-decomposition onset temperature of the polymer latex. In some embodiments, when the twin-screw system is a twin-screw extruder, there is a plurality of extruder zones, wherein zone temperatures for each of the extruder zones may be independently controlled, such as via a control panel or computer interface. When the twin-screw system is a batch or semi-batch twin-rotor mixer, the mixer may be operated at a single temperature or at a time-varying temperature, if desired.

The twin-screw system may be heated with a heat-transfer medium selected from the group consisting of steam, hot oil, electrical-heating elements, and combinations thereof. The twin-screw system may be cooled with a heat-transfer medium selected from the group consisting of cooling water, air, oil, and combinations thereof. In the case of a twin-screw extruder, heating and cooling configurations may be designed based on the desired temperature profile along the length of the twin-screw extruder, the throughput, the materials present, shear rates, screw design, and other parameters.

In some embodiments, the twin-screw system is electrically heated using resistance coils, bands, or cuffs that are strapped or bolted around a barrel or mixer bowl. Upon demand, such as initiated by a thermocouple, electrical current is passed through the resistance wire, inside the coil. The resistance produces heat that increases the barrel or mixer bowl temperature, and the system internal temperature via heat transfer. For a twin-screw extruder, the resistance settings required to achieve a desired temperature will depend on the screw rotational speed, the pressure within the system, and the throughput.

In some embodiments, a twin-screw extruder is configured with steam heating for one or more barrels. Upon demand, such as initiated by a thermocouple, steam is introduced to the barrel surface for indirect heating (i.e., steam is not introduced directly into the extruder), thereby increasing the barrel temperature and the extruder internal temperature via heat transfer. For a twin-screw extruder, the steam pressure and flow rate to achieve a desired temperature will depend on the screw rotational speed, the pressure within the system, and the throughput.

In some embodiments, a twin-screw extruder is equipped with an air-cooling system to reduce temperature when too much heating has occurred (e.g., electrical heating exceeds set point, or shear heating has become excessive). An exemplary air-cooling system consists of fans that circulate air around the barrel on demand.

In some embodiments, a twin-screw extruder is equipped with a liquid cooling system, such as a closed-loop heat exchanger using cooling water contained inside a sealed coil surrounding the barrel. When a set-point temperature is exceeded, the vapor from this cooling water is cooled by water flow so that the cooling water vapor condenses to absorb more heat.

The twin-screw system is preferably configured with one or more system vents to remove at least some of the water from the nanocellulose slurry. A "vent" is a port, adjustable valve, pressure-relief valve, pressure-relief disk, water-permeable membrane, or other device that allows water vapor to be released from the system. A vent may be normally-open or normally-closed, e.g. the vent may be designed only to open when there is sufficient outward vapor pressure or upon demand. In the case of a twin-screw extruder, a vent may be referred to as an extruder vent. In the case of a twin-rotor mixer, a vent may be referred to as a mixer vent.

In some embodiments of a twin-screw extruder, an extruder vent is built into a barrel. In these or other embodiments, an extruder vent may be configured in a vent ring or other vent element between axially adjacent barrels. In the case of a gear pump extruder, an extruder vent may be built into gear box, the case seal, or the suction port, for example.

Generally, a system vent allows for volatiles, such as water vapor, and entrapped air to be removed from the system. Dewatering or drying of the nanocellulose (or other particulate) slurry means that at least water (or other primary liquid) is removed. Other components may be removed from a system vent, sometimes unintentionally (e.g., minor entrainment of solids). In some embodiments, the system vent allows removal not only of some water but also removal of components derived from the nanocellulose production process, such as acids, sugar-degradation compounds, or lignin-derived compounds.

The number of system vents may vary, such as 1, 2, 3, 4, 5, or more, depending on the total length of a twin-screw extruder or the total volume of a twin-rotor mixer, for example. The placement of extruder vents may vary along the length of the twin-screw extruder. For example, when there is an increasing temperature profile along the extruder length, an extruder vent may be placed near the end of the extruder where water vaporization is faster or more thermodynamically favorable.

A system vent may allow vapors to escape to the atmosphere or may be adapted to a flow line such that the vapors may be captured and potentially reused for other purposes, or analyzed for composition, for example. The flow line may be in communication with a vacuum system, such that the vent is under vacuum. When multiple vents are utilized, each of the vents may be sized the same or differently, i.e. one vent may have a larger opening area (for more vapor release) than another vent.

In some embodiments, at least one of the system vents is operated under vacuum. When multiple system vents are utilized, each of the system vents may be operated under vacuum, or less than all of the system vents may be operated under vacuum. The vacuum pressure may be from about 0.01 bar to about 0.99 bar (absolute pressure), such as about 0.05, 0.1, 0.2, 0.3, 0.4, 0.5, 0.6, 0.7, 0.8, 0.9, 0.95 bar. When there are multiple system vents, they may be operated at the same pressure or at different pressures. As an illustration, if there are three system vents (as implied in FIGS. 1 and 2), all three vents may be connected to a common vacuum system that operates at −0.9 bar gauge pressure, which is 0.1 bar absolute pressure. Or, for example, two system vents may be at 0.5 bar pressure while one vent is at atmospheric pressure (1 bar).

A twin-screw extruder outlet typically is configured with an extruder die. The extruder die is the assembly, located at the end of the extruder, which contains an orifice to allow dewatered nanocellulose to flow out. The extruder die is a block of metal or metal alloy, which may be the same material as the screws and/or the barrels. In certain embodiments, an extruder vent is configured as part of the extruder die at or near the extruder outlet. When the extruder outlet is open to the atmosphere, an additional amount of water vapor release may take place.

In addition to number and size of extruder vents and the vacuum levels, other parameters may dictate the efficiency of water removal from a twin-screw extruder. For example, longer residence times specifically in the zone(s) with an extruder vent will help since there is more time for water mass transport to the vent. Screw design may be optimized such that one or more screw elements enhance water flashing and removal out of the extruder vent(s). A higher surface area of the mixture, from high shear rates, may assist by reducing diffusion and/or convection mass-transport limitations. Of course, the temperature and pressure within the extruder, or within extruder zones, will dictate whether water is present in liquid or vapor states, at thermodynamic equilibrium. True equilibrium may or may not be present.

One skilled in the art of chemical engineering can experiment with the twin-screw system and vary the number and size of vents, the vacuum pressures, screw or rotor design, and the process conditions within the system to determine the number of vents required to achieve a desired extent of dewatering or drying. Alternatively, or additionally, one skilled in the art of chemical engineering can simulate the twin-screw system and vary the number of vents, the vacuum pressures, and the process conditions to calculate or estimate the number of vents required to achieve a desired extent of dewatering or drying. For example, it may be assumed that each vent can be modeled as one equilibrium flash stage with full vapor disengagement and no solids entrainment. In reality, due to high surface area (thin film) in the twin-screw system, there may be more than one equilibrium flash occurring at each vent.

When an optional milling device is present, the milling device may be connected directly to the system outlet, such that the system outlet (e.g., extruder outlet) is essentially the milling device inlet. Alternatively, the masterbatch may be collected from the outlet and then, at potentially a later time and/or at a different location, introduced to the milling device. The milling device may be selected from a hammer mill, a ball mill, a jet mill, an impact crusher, a pulverizer, a cage mill, a grinder, or an extruder, for example. The milling device may be operated to reduce the particle size of the nanocellulose-dispersion concentrate, such as to an average size range of about 10 microns to about 1 millimeter, e.g. about 25, 50, 100, 200, 300, 400, 500, 600, 700, 800, 900, or 950 microns.

In various embodiments, the dispersion/drying agent may be selected from the group consisting of natural rubber latex, waxes, polyolefins, olefin-maleic anhydride copolymers, olefin-acrylic acid copolymers, polyols, fatty acids, fatty alcohols, polyol-glyceride esters, polydimethylsiloxanes, polydimethylsiloxane-alkyl esters, polyacrylamides, starches, cellulose derivatives, and combinations or reaction products thereof, in the form of a polymer latex.

The twin-screw system may be a twin-screw extruder, such as a co-rotating twin-screw extruder, a counter-rotating twin-screw extruder, or another type of twin-screw extruder (e.g., a gear pump extruder). Some design and operation principles of twin-screw extruders were discussed above.

The twin-screw system temperature is preferably monitored and controlled. The system temperature refers to the temperature of the material internally in the system, not the outer barrel or mixer bowl temperature, although the barrel or mixer bowl temperature may be measured and correlated with the system temperature. When a twin-screw extruder contains a plurality of extruder zones, it is preferred that zone temperatures for each of the extruder zones are independently monitored and controlled. Control of temperature may utilize programmable control logic executed by a computer using well-known techniques.

The twin-screw system may be operated with an average system temperature from about 120° C. to about 250° C., for example. The average system temperature may be calculated as the average of all temperatures measured, or may be estimated based on temperature measurements and other parameters (e.g., amount of water released, solids concentration at outlet, etc.). In a continuous twin-extruder extruder, zone temperatures may be measured, i.e. temperatures at different spatial points. In a batch or semi-batch twin-rotor mixer, temperatures at different points in time may be measured, and the system may be at a constant temperature or a time-varying temperature. In the case of a twin-screw extruder, even at a given extruder zone, a measured temperature represents an average within that zone, as the local temperature profile around and between the screws is usually complex. In various embodiments, the average extruder temperature is about, at least about, or at most about 120° C., 125° C., 130° C., 135° C., 140° C., 145° C., 150° C., 160° C., 170° C., 180° C., 190° C., 200° C., 210° C., 220° C., 230° C., 240° C., or 250° C.

The twin-screw system may be operated with a maximum extruder temperature from about 150° C. to about 300° C., for example. In various embodiments, the maximum system temperature is about, or at most about 150° C., 160° C., 170° C., 180° C., 190° C., 200° C., 210° C., 220° C., 230° C., 240° C., 250° C., 260° C., 270° C., 280° C., 290° C., or 300° C. The twin-screw system is preferably operated with a maximum system temperature that is less than the thermal-decomposition onset temperature of the nanocellulose (or other selected particulate).

In certain continuous embodiments, the zone temperatures increase along the length of the twin-screw extruder. In other certain embodiments, zone temperatures decrease along the length of the twin-screw extruder. It is also possible to have non-monotonic temperature profiles along the extruder.

The twin-screw system may be heated with a heat-transfer medium selected from the group consisting of steam, hot oil, electrical-heating elements, and combinations thereof. The twin-screw system may be cooled with a heat-transfer medium selected from the group consisting of cooling water, air, oil, and combinations thereof. Heating and cooling configurations may be designed based on the desired temperature profile, the throughput, the materials present, shear rates, screw or rotor design, and other parameters.

A continuous twin-screw extruder may be operated with a wide range of shear rates, including axial shear rates and radial shear rates. Without limiting the scope of the present invention in any way, the twin-screw extruder may be operated with an average axial shear rate from about 10 $s^{-1}$ to about 200 $s^{-1}$, for example, such as about, or at least about, 20, 30, 40, 50, 60, 70, 80, 90, 100, 110, 120, 130, 140, 150, 160, 170, 180, or 190 $s^{-1}$. Without limiting the scope of the present invention in any way, the twin-screw extruder may be operated with an average radial shear rate from about 100 $s^{-1}$ to about 10000 $s^{-1}$ ($10^3$/s), for example, such as about, or at least about, 110, 125, 150, 200, 300, 400, 500, 1000, 2000, 3000, 4000, or 5000 $s^{-1}$. Typically, radial shear rates are significantly higher than axial shear rates. Note that local shear rates can be substantially higher than average shear rates, especially for radial shear.

A batch or semi-batch twin-rotor mixer may be operated with a wide range of shear rates. Without limiting the scope of the present invention in any way, the twin-rotor mixer may be operated with an average radial shear rate from about 10 $s^{-1}$ to about 10000 $s^{-1}$, for example, such as about, or at least about, 25, 50, 100, 125, 150, 200, 300, 400, 500, 1000, 2000, 3000, 4000, or 5000 $s^{-1}$.

The twin-screw system may be operated with an average nanocellulose residence time from about 30 seconds to about 120 minutes, for example. In various embodiments, the average nanocellulose residence time is about, at least about, or at most about 0.1, 0.2, 0.3, 0.4, 0.5, 0.6, 0.7, 0.8, 0.9, 1, 2, 3, 4, 5, 6, 7, 8, 9, 10, 15, 20, 30, 40, 50, 60, 70, 80, 90, or 100 minutes. When the twin-screw system is a batch system, the residence time is the batch time (e.g., 90 minutes).

The residence time of the water will generally be different, both because a multiphase system has distinct residence-time distributions for different phases, and because at least some of the water exits from the twin-screw extruder. In various embodiments, the average water residence time is about, at least about, or at most about 0.1, 0.2, 0.3, 0.4, 0.5, 0.6, 0.7, 0.8, 0.9, 1, 2, 3, 4, 5, 6, 7, 8, 9, or 10 minutes.

The residence-time distributions of materials in a twin-screw extruder will depend on whether the extruder is fully filled or starve-fed. A fully filled extruder means that during operation, there is material in all of the internal volume, except for entrapped air. In a starve-fed extruder, during operation there are internal extruder regions that do not contain material (nanocellulose or water). The more filled the screw gaps, the tighter the nanocellulose residence-time distribution; conversely, the more starved the screws, the wider the nanocellulose residence-time distribution. Starved screws may give a flow pattern that is more well-mixed in the axial direction compared to fully filled plug flow. Axial mixing may be desirable for water removal because the local residence time and mass transport of water in axially mixed zones with extruder vents may be higher.

In some embodiments, at least one of the system vents is operated under vacuum. When step (d) utilizes multiple system vents, each of the system vents may be operated under vacuum, or less than all of the system vents may be operated under vacuum.

In various embodiments, the extent of water removal from the particulate slurry, out of the twin-screw system, may vary from about 10% to 100%, calculated as water removed from particulate slurry divided by total water present in the material fed to the extruder. The extent of water removal may be about, or at least about, 15%, 20%, 25%, 30%, 35%, 40%, 45%, 50%, 55%, 60%, 65%, 70%, 75%, 80%, 85%, 90%, 95%, or 99%, including all intervening ranges.

In various embodiments, the extent of water removal from the particulate slurry, from the overall system (all process steps), may vary from about 25% to 100%, calculated as water removed from particulate slurry divided by total water present in the material fed to the system. The extent of water removal may be about, or at least about, 30%, 35%, 40%, 45%, 50%, 55%, 60%, 65%, 70%, 75%, 80%, 85%, 90%, 95%, 99%, or 100%, including all intervening ranges. In these embodiments, the water removed from the centrifuge may be from about 10% to about 95% of the total water removed from the system, for example.

When at least one type of particulate is nanocellulose, the nanocellulose may include cellulose nanocrystals, cellulose nanofibrils, microfibrillated cellulose, or a combination thereof. In some embodiments, the nanocellulose includes lignin-containing nanocellulose. In certain embodiments, the nanocellulose includes lignin-coated nanocellulose.

As a rule of thumb, but without limitation, nanocellulose slurries may be dewatered to approximately 10-25 wt % nanocellulose before irreversible agglomeration starts to become significant, depending on drying temperature profile. Notwithstanding that rule of thumb, the use of a twin-screw extruder—even without any dispersion/drying agents—provides benefits arising from the especially intimate mixing that takes place in a twin-screw extruder. For example, the extent of nanocellulose agglomeration or reversibility of agglomeration may be improved when a twin-screw system is used for dewatering or drying, compared to other devices, independent of the dispersion/drying agent (if any). It is preferable, however, to employ a dispersion/drying agent especially when extensively dewatering (e.g., completely drying) the slurry.

In some embodiments, a compatibilizer is introduced to the process for making a particulate masterbatch. Compatibilizers are materials that suppress phase separation between two other components of a mixture, by promoting the interaction between the two other components, thereby providing stable phase morphologies. For example, polymer blends typically have coarse, unstable phase morphologies; this results in poor mechanical properties. Compatibilizing makes a more stable and better blended phase morphology by creating interactions between the two previously immiscible components. In the present invention, the two components that may be compatibilized may be the particulates, on the one hand, with the polymer latex or the polymer solids, on the other hand. Alternatively, or additionally, the two components that may be compatibilized may be the particulates, on the one hand, with the matrix polymer, on the other hand. A compatibilizer that functions to compatibilize the particulates with the polymer latex or polymer solids may also function to compatibilize the particulates with the matrix polymer, after the particulate masterbatch is introduced to the matrix polymer. In these situations, the compatibilizer may additionally function to compatibilize the polymer latex or polymer solids with the matrix polymer.

The mechanism of the compatibilizers may vary. In some embodiments, the compatibilizer lowers the interfacial tension, thereby promoting break up of droplets during processing. In some embodiments, the compatibilizer helps prevent subsequent coalescence of the droplet, thereby stabilizing the blend. The compatibilizer may function purely as a physical compatibilizer, or as a chemically reactive compatibilizer, or a combination thereof. When the compatibilizer is a chemically reactive compatibilizer, a chemical bond may be formed between the compatibilizer and at least one of the components being compatibilized. In some embodiments, a chemically reactive compatibilizer functions by forming a chemical bond between the compatibilizer and both of the components being compatibilized, acting as a chemical coupling agent. The type of bonding may be hydrogen bonding, ionic bonding, covalent bonding, or a combination thereof. Functional groups in the compatibilizer may react with end groups or surface groups present in the particulates and/or the polymer latex or solids. Another approach is to add functional groups to the compatibilizer by grafting, such as with maleic anhydride.

The compatibilizer may be selected from the group consisting of waxes, polyolefins, olefin-maleic anhydride copolymers, olefin-acrylic acid copolymers, polyols, fatty acids, fatty alcohols, polyol-glyceride esters, polydimethylsiloxanes, polydimethylsiloxane-alkyl esters, polyacrylamides, starches, cellulose derivatives, particulates, succinic anhydride, alkenylsuccinic anhydrides, alkyl ketene dimers, olefin-styrene copolymers, olefin-glycidyl copolymers, olefin-methacrylate copolymers, olefin-styrene-glycidyl copolymers, olefin-glycidyl-methacrylate copolymers, olefin-styrene-glycidyl-methacrylate copolymers, and combinations or reaction products thereof.

In some embodiments, the compatibilizer is selected from maleic anhydride-grafted natural rubber, maleic anhydride-grafted polyisoprene, maleic anhydride-grafted polybutadiene, or analogues or combinations thereof.

In some embodiments, the compatibilizer is selected from alkenylsuccinic anhydrides, such as those having the formula:

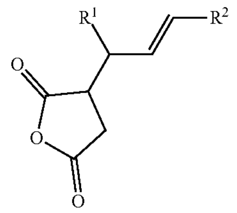

wherein $R^1$ is selected from H, $C_1$-$C_{24}$ linear or branched alkanes, $C_2$-$C_{24}$ linear or branched alkenes, $C_6$-$C_{24}$ linear or branched aromatics, or a combination thereof; and wherein $R^2$ is selected from H, $C_1$-$C_{24}$ linear or branched alkanes, $C_2$-$C_{24}$ linear or branched alkenes, $C_6$-$C_{24}$ linear or branched aromatics, or a combination thereof.

In some embodiments using alkenylsuccinic anhydrides, le is selected from $C_2$-$C_{24}$ linear or branched alkanes, $C_4$-$C_{24}$ linear or branched alkenes, $C_8$-$C_{24}$ linear or branched aromatics, or a combination thereof; and $R^2$ is selected from $C_2$-$C_{24}$ linear or branched alkanes, $C_4$-$C_{24}$ linear or branched alkenes, $C_8$-$C_{24}$ linear or branched aromatics, or a combination thereof. In certain embodiments, $R^1$ is selected from $C_5$-$C_{15}$ linear or branched alkanes; and $R^2$ is selected from $C_5$-$C_{15}$ linear or branched alkanes.

Succinic anhydride may be prepared by catalytically hydrogenating the C═C double bond in maleic anhydride, for example. Succinic anhydride also may be prepared by dehydrating succinic acid, which itself may be produced via fermenting biomass-derived sugars using a suitable microorganism.

Alkenylsuccinic anhydrides may be prepared by reacting maleic anhydride with olefins having the desired chain length. The C═C double bond becomes a single C—C bond, but since there is at least one C═C double bond in the olefin reactant, that double bond survives and is present in the alkenylsuccinic anhydride.

In some embodiments, the compatibilizer is selected from alkyl ketene dimers, such as those having the formula:

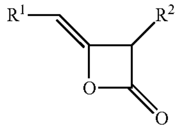

wherein $R^1$ is selected from $C_4$-$C_{24}$ linear or branched alkanes, $C_4$-$C_{24}$ linear or branched alkenes, $C_6$-$C_{24}$ linear or branched aromatics, or a combination thereof; and wherein $R^2$ is selected from $C_4$-$C_{24}$ linear or branched alkanes, $C_4$-$C_{24}$ linear or branched alkenes, $C_6$-$C_{24}$ linear or branched aromatics, or a combination thereof.

Alkyl ketene dimers are a family of organic compounds based on the 4-membered ring system of oxetan-2-one. In some embodiments using alkyl ketene dimers, $R^1$ is selected from $C_8$-$C_{24}$ linear or branched alkanes, $C_8$-$C_{24}$ linear or branched alkenes, $C_8$-$C_{24}$ linear or branched aromatics, or a combination thereof; and $R^2$ is selected from $C_8$-$C_{24}$ linear or branched alkanes, $C_8$-$C_{24}$ linear or branched alkenes, $C_8$-$C_{24}$ linear or branched aromatics, or a combination thereof. In certain embodiments, $R^1$ is selected from $C_{10}$-$C_{18}$ linear or branched alkanes; and $R^2$ is selected from $C_{10}$-$C_{18}$ linear or branched alkanes.

Alkyl ketene dimers may be prepared by reacting long-chain carboxylic acid chlorides in inert solvents (such as diethyl ether) with triethylamine as tertiary amine under anhydrous conditions. After filtration of the insoluble triethylamine hydrochloride and evaporation of the solvent, long-chain alkyl chain dimers are obtained.

In some embodiments, the compatibilizer is selected from olefin-styrene-glycidyl-methacrylate copolymers. An exemplary olefin-styrene-glycidyl-methacrylate copolymer is polypropylene homopolymer grafted with poly(styrene-co-methyl methacrylate-co-glycidyl methacrylate), such as AddiCo® 5933 from AddiCo in Mexico.

Some variations provide a product comprising:

(a) from about 0.05 wt % to about 50 wt % of one or more particulates;

(b) from about 0.05 wt % to about 10 wt % compatibilizer, wherein the compatibilizer is selected from the group consisting of waxes, polyolefins, olefin-maleic anhydride copolymers, olefin-acrylic acid copolymers, polyols, fatty acids, fatty alcohols, polyol-glyceride esters, polydimethylsiloxanes, polydimethylsiloxane-alkyl esters, polyacrylamides, starches, cellulose derivatives, particulates, succinic anhydride, alkenylsuccinic anhydrides, alkyl ketene dimers, olefin-styrene copolymers, olefin-glycidyl copolymers, olefin-methacrylate copolymers, olefin-styrene-glycidyl copolymers, olefin-glycidyl-methacrylate copolymers, olefin-styrene-glycidyl-methacrylate copolymers, and combinations or reaction products thereof; and (c) from about 50 wt % to about 99.9 wt % matrix material.

In some embodiments, the product consists essentially of the particulates, the compatibilizer, and the matrix material.

In some embodiments, the particulates are present at a concentration of about 0.1 wt % to about 40 wt % in the product. In various embodiments, the particulates are present in the product at a concentration of about, at least about, or at most about 0.1, 0.2, 0.3, 0.4, 0.5, 1, 1.5, 2, 2.5, 3, 4, 5, 10, 15, 20, 25, 30, 35, or 40 wt %, including any intervening range.

In some embodiments, the weight ratio of the particulates to the compatibilizer is selected from about 0.1 to about 100. In various embodiments, the weight ratio of the particulates to the compatibilizer is about, at least about, or at most about 0.1, 0.2, 0.5, 1, 2, 3, 4, 5, 10, 15, 20, 25, 30, 40, 50, 60, 70, 80, 90, or 100, including any intervening range.

In some embodiments, the compatibilizer is a functionalized polyalkylene wax that is functionalized for compatibility with nanocellulose. As used herein, a "functionalized" hydrogen-containing compound is one in which at least one hydrogen atom is replaced by a functional group. Without limitation, —H may be replaced by —OH, —COOH, =O, or other oxygen-containing functional groups. In certain embodiments, —H may be replaced by non-oxygen-containing functional groups, such as metals, halogens, nitrogen, sulfur, or groups containing these components, for example.

The functionalized polyalkylene wax may be a functionalized polyethylene wax, a functionalized polypropylene wax, a functionalized polybutylene wax, or a combination thereof. In certain embodiments, the compatibilizer is a low-molecular weight oligomer or polymer of ethylene or functionalized ethylene. When functionalized ethylene is utilized, each repeat unit may have an average of about 0.1 to about 4.0 hydrogen atoms replaced by other functional groups. The number-average degree of polymerization of the ethylene or functionalized ethylene may be from 2 to 1000, such as from 5 to 500. In various embodiments, the number-average degree of polymerization of the ethylene or functionalized ethylene is, is at least, or is at most 2, 3, 4, 5, 6, 7, 8, 9, 10, 11, 12, 13, 14, 15, 25, 50, 75, 100, 150, 200, 300, 400, 500, 600, 700, 800, 900, or 1000, including all intervening ranges.

In some embodiments, the compatibilizer is a copolymer of (a) one or more $C_2$-$C_4$ olefins and (b) maleic anhydride. $C_2$ olefin is ethylene, $C_3$ olefin is propylene, and $C_4$ olefin is 1-butene, 2-butene, isobutene, 1,3-butadiene, or a combination thereof. The $C_2$-$C_4$ olefins may be functionalized olefins, such as functionalized ethylene. Maleic anhydride is an organic compound with the formula $C_2H_2(CO)_2O$ and is the acid anhydride of maleic acid. For purposes herein, a polymer of maleic acid, or a salt thereof, is deemed to be also a polymer of maleic anhydride. The maleic anhydride may be produced from 5-hydroxymethylfurfural, which may itself be derived from biomass (glucose dehydration), for example. The $C_2$-$C_4$ olefins may also be produced from biomass, such as via dehydration of alcohols that are produced by fermentation of sugar.

The copolymer of a $C_2$-$C_4$ olefin and maleic anhydride may be a block copolymer, an alternating copolymer, a random copolymer, or a combination thereof. In the case of the olefin being ethylene, for example, the copolymer may be poly(ethylene-alt-maleic anhydride) and/or poly(ethylene-graft-maleic anhydride). A graft copolymer is a type of copolymer in which one or more blocks of homopolymer are grafted as branches onto a main chain, meaning it is a branched copolymer with one or more side chains of a homopolymer attached to the backbone of the main chain. As such, poly(ethylene-graft-maleic anhydride) can also be considered a polymer of functionalized ethylene in which ethylene is functionalized with maleic acid or maleic anhydride. This type of copolymer may also be referred to as maleated polyethylene.

In some embodiments, the compatibilizer is a copolymer of (a) one or more $C_2$-$C_4$ olefins and (b) acrylic acid. $C_2$ olefin is ethylene, $C_3$ olefin is propylene, and $C_4$ olefin is 1-butene, 2-butene, isobutene, 1,3-butadiene, or a combination thereof. The $C_2$-$C_4$ olefins may be functionalized olefins, such as functionalized ethylene. Acrylic acid is an organic compound with the formula $CH_2{=}CHCOOH$. For purposes of this specification, a polymer of acrylic acid, or a salt thereof, is deemed to be also a polymer of acrylic anhydride.

The copolymer of a $C_2$-$C_4$ olefin and acrylic acid may be a block copolymer, an alternating copolymer, a random copolymer, or a combination thereof. Typically, the acrylic acid polymerizes across its double bond, similar to ethylene polymerization (e.g., in free-radical copolymerization), resulting in a copolymer that can be considered a graft copolymer or a polymer of functionalized ethylene in which ethylene is functionalized with acrylic acid.

In some embodiments, the compatibilizer includes a fatty acid. A fatty acid is a carboxylic acid with a long aliphatic chain, either saturated or unsaturated, and is considered a polymer in this specification. Most naturally occurring fatty acids have an unbranched chain of an even number of carbon atoms, from 4 to 28. The fatty acid herein may be selected from caprylic acid, capric acid, lauric acid, stearic acid, arachidic acid, behenic acid, lignoceric acid, cerotic acid, or a combination thereof, for example. Fatty acids that are unsaturated and/or branched may be employed.

In some embodiments, the compatibilizer includes a fatty alcohol. A fatty alcohol is a long-chain alcohol that is a straight-chain primary alcohol, ranging from 4 to 26 carbon atoms, and is considered a polymer in this specification. Exemplary fatty alcohols include lauryl alcohol (dodecanol), stearyl alcohol, and oleyl alcohol. Fatty alcohols may be oily liquids (for smaller carbon numbers) or waxy solids. Fatty alcohols typically have an even number of carbon atoms and a single alcohol group attached to the terminal carbon. Some are unsaturated and some are branched. Fatty alcohols that are unsaturated and/or branched may be employed. Fatty alcohols with an odd number of carbon atoms may be employed. Ethylene may be oligomerized and the oligomer subjected to hydroformylation, generating an odd-numbered aldehyde, which may subsequently be hydrogenated. For example, from 1-decene, hydroformylation gives the $C_{11}$ alcohol.

In some embodiments, the compatibilizer includes a polysiloxane. The polysiloxane may have one or more functional groups selected from the group consisting of methyl, $C_2$-$C_{24}$ alkyl, epoxide, hydroxy, amino, carboxyl, acrylate, and combinations thereof. An exemplary polysiloxane is polydimethylsiloxane.

A polysiloxane preferably provides a hydrophobic portion and a hydrophilic portion. Typically the hydrophobic and hydrophilic portions are at opposite ends of a polymer chain. In certain embodiments, the compatibilizer includes an alkyl ester polydimethylsiloxane emulsion.

In some embodiments, the compatibilizer includes starch, such as cationic starch, amphoteric starch, thermoplastic starch, or a combination thereof. Starch is a polymer of glucose.

Cationic starch is positively charged, which can be desirable when nanocellulose (or other particulate) particles have slight negative surface charges. Exemplary cationic starches include quaternary ammonium cationic starch and tertiary amino cationic starch.

Amphoteric starch is a modified starch that contains positively and negatively charged substituent groups. An exemplary amphoteric starch contains quaternary ammonium cationic groups and phosphates as anionic groups.

Thermoplastic starch is starch that has been plasticized by relatively low levels (e.g., 15-30 wt %) of molecules that are capable of hydrogen bonding with the starch hydroxyl groups. The starch plasticizers may be water, polyols (e.g., glycerol), pentaerythritol, sugar alcohols (e.g., sorbitol), poly(oxyethylene)s, poly(oxypropylene)s, non-ionic surfactants, anionic surfactants, or a combination thereof.

In some embodiments, the compatibilizer is selected based on, at least in part, the final composite, i.e. end-use application. The final composite sometimes uses the same polymer as the polymer in the masterbatch, but that is not necessarily the case.

A compatibilizer may have other functions besides enhancing dispersion of particulates. For example, in some embodiments, the compatibilizer may also function as a plasticizer, a density modifier, a viscosity modifier, or a toughness modifier. The compatibilizer may also provide ancillary attributes, such as color or texture, to the final material.

In preferred embodiments of the particulate masterbatch, the masterbatch is in solid, powder form. The powder may be pelletized into spheres, cylinders, plates, or other geometry.

The particulate masterbatch may be produced in prepackaged form. The pre-packaging may be in small containers, tubes, vials, jars, or bags, for example, in a prepackaging material that may be glass, plastic, coated paper, etc. In certain embodiments, the particulate masterbatch is provided in powder form, such as a dry powder. In other embodiments, the particulate masterbatch is pelletized or compressed into various geometries, such as spheres, beads, rods, cylinders, plates, etc. In some embodiments, the particulate masterbatch is part of a kit that includes prepackaged masterbatch along with use instructions that are tailored for a specific composite system.

In other embodiments, the particulate masterbatch is in liquid form or in a masterbatch solvent, such as water, $C_1$-$C_8$ alcohols, $C_2$-$C_8$ polyols, or a combination thereof. In certain embodiments, the masterbatch is in powder form but contains water or other solvent absorbed in the solids.

All processes disclosed herein may be done in batch, continuously, or semi-continuously. The feed throughout may vary widely, including lab scale, pilot scale, semi-works scale, and commercial scale.

Nanocellulose may be characterized by the unbound and bound moisture. This ratio is generally different for lignin-containing nanocellulose, compared to non-lignin-containing nanocellulose, all other factors being the same. Accordingly, the configuration of the equipment and operating parameters may be adapted to the ratio of unbound to bound moisture in the system feed. In some embodiments, the centrifuge targets removal of unbound water while the extruder is able to remove bound water due to high shear forces in conjunction with thermal energy.

The present invention accommodates a wide variety of nanocellulose materials. Nanocellulose can be produced by breaking down biomass to sub-micron cellulose nanofibrils or nanocrystals using chemical means, mechanical means, or a combination of chemical and mechanical means. Other methods for providing nanocellulose, such as bacterial nanocellulose and tunicate-derived nanocellulose, are also available.

Typically, the production of nanocellulose occurs in two primary stages. The first stage is a purification of biomass to remove most of the non-cellulose components in the biomass such as lignin, hemicelluloses, extractives, and inorganic contaminants. This stage is typically performed by conventional pulping and bleaching. For production of cellulose nanofibrils, the second stage typically entails mechanical refining of the purified biomass fibers, with or without chemical or enzymatic treatment to lower the amount of mechanical energy required. For cellulose nanocrystals, the second stage typically entails acidic hydrolysis of the purified fibers, followed by high-shear mechanical treatment.

The nanocellulose may be obtained from fractionation of lignocellulosic biomass in the presence of an acid catalyst, a solvent for lignin, and water, to generate cellulose-rich solids, following by mechanical treatment of the cellulose-rich solids to generate the nanocellulose or a precursor thereof. In some embodiments, the solvent for lignin is an aliphatic alcohol (e.g., ethanol) and the acid catalyst is a sulfur-containing compound selected from the group consisting of sulfur dioxide, sulfurous acid, sulfur trioxide, sulfuric acid, elemental sulfur, sulfonic acids, lignosulfonic acids, and combinations thereof.

The nanocellulose may be obtained from an AVAP® lignocellulosic biomass fractionation process. It has been found that very high crystallinity can be produced and maintained during formation of nanofibers or nanocrystals, without the need for an enzymatic or separate acid treatment step to hydrolyze amorphous cellulose. High crystallinity can translate to mechanically strong fibers or good physical reinforcing properties, which are advantageous for composites, reinforced polymers, and high-strength spun fibers and textiles, for example.

In some embodiments, the nanocellulose includes hydrophobic nanocellulose. In these or other embodiments, the nanocellulose includes hydrophilic nanocellulose. In certain embodiments, the nanocellulose includes lignin-containing cellulose nanocrystals (e.g., lignin-coated cellulose nanocrystals) and/or lignin-containing cellulose nanofibrils (e.g., lignin-coated cellulose nanofibrils).

In some embodiments, the nanocellulose material is at least partially hydrophobic via deposition of at least some of the lignin onto a surface of the cellulose-rich solids (nanocellulose precursor). In these or other embodiments, the nanocellulose material is at least partially hydrophobic via deposition of at least some of the lignin onto a surface of the nanocellulose material following mechanical refining.

In some embodiments, the acid is $SO_2$ at a concentration from about 5 wt % to about 30 wt %. In some embodiments, the fractionation temperature is from about 130° C. to about 180° C. In some embodiments, the fractionation time is from about 15 minutes to about 4 hours. The process may be controlled such that a portion of the solubilized lignin intentionally is deposited back onto surfaces of the cellulose-rich solids, thereby rendering the cellulose-rich solids at least partially hydrophobic.

Process conditions may be employed which tend to promote lignin deposition onto fibers, such as extended time and/or temperature, or reduced concentration of solvent for lignin. Alternatively, or additionally, one or more washing steps may be are adapted to deposit at least some of the lignin that was solubilized during the initial fractionation. One approach is to wash with water rather than a solution of water and solvent. Because lignin is generally not soluble in water, it will begin to precipitate. Optionally, other conditions may be varied, such as pH and temperature, during fractionation, washing, or other steps, to optimize the amount of lignin deposited on surfaces. Optionally, a process for producing a hydrophobic nanocellulose material may further include chemically modifying the lignin to increase hydrophobicity of the nanocellulose material.

Alternatively, or additionally, the nanocellulose may be obtained from fractionation of lignocellulosic biomass in the presence of steam or hot water, optionally with a fractionation catalyst (e.g., acetic acid), to obtain cellulose-rich solids, followed by mechanical refining of the cellulose-rich solids to generate nanocellulose. These steps may collectively be referred to as hydrothermal-mechanical treatment. The reaction solution for fractionation may consist essentially of the steam or hot water. Note that "steam or hot water" refers to water that will be in one or more phases dictated by thermodynamics at the given temperature and pressure. The temperature for the fractionation may be from about 120° C. to about 220° C., such as about 150-200° C. The water may be in the form of steam, superheated steam, supersaturated steam, or pressurized liquid water. In some embodiments, the fractionation step is carried out with a residence time from about 1 minute to about 60 minutes, such as about 2, 2.5, 3, 3.5, 4, 5, 7.5, 10, 12.5, 15, 20, 25, 30, 35, 40, 45, 50, or 55 minutes.

In embodiments employing hydrothermal-mechanical treatment, the cellulose-rich solids usually contain a significant concentration of lignin. Therefore, these embodiments can be beneficial when hydrophobic nanocellulose is desired. The hydrothermal-mechanical treatment may generate a nanocellulose that can be referred to as nanolignocellulose due to high lignin content. The nanolignocellulose may contain, on a bone-dry, ash-free, and acetyl-free basis, from about 35 wt % to about 80 wt % cellulose nanofibrils, cellulose microfibrils, or a combination thereof, from about 15 wt % to about 45 wt % lignin, and from about 5 wt % to about 20 wt % hemicelluloses. Of the lignin present, some may coat nanocellulose particles, while the remainder of the lignin is internal to the nanocellulose particles.

Nanocellulose is preferably obtained from lignocellulosic biomass. As used herein, "lignocellulosic biomass" means any material containing cellulose and lignin. Lignocellulosic biomass may also contain hemicellulose. Mixtures of one or more types of biomass can be used. In some embodiments, the biomass feedstock comprises both a lignocellulosic component (such as one described above) in addition to a sucrose-containing component (e.g., sugarcane or energy cane) and/or a starch component (e.g., corn, wheat, rice, etc.). Various moisture levels may be associated with the starting biomass. The biomass feedstock need not be, but may be, relatively dry. In general, the biomass is in the form of a particulate or chip, but starting biomass particle size is not critical.

The biomass feedstock for making nanocellulose may be selected from hardwoods, softwoods, forest residues, eucalyptus, industrial wastes, pulp and paper wastes, consumer wastes, or combinations thereof. Some embodiments utilize agricultural residues, which include lignocellulosic biomass associated with food crops, annual grasses, energy crops, or other annually renewable feedstocks. Exemplary agricultural residues include, but are not limited to, corn stover, corn fiber, wheat straw, sugarcane bagasse, sugarcane straw, rice straw, oat straw, barley straw, miscanthus, energy cane straw/residue, or combinations thereof.

Other sources of nanocellulose include bacterial nanocellulose, nanocellulose from tunicates, treatment of pulp with sulfuric acid, treatment of pulp with 2,2,6,6-tetramethylpiperidine-1-oxy radical (TEMPO), or treatment of pulp with cellulase enzymes. In some embodiments, the nanocellulose employed herein is not bacterial nanocellulose, is not derived from tunicates, is not obtained from sulfuric acid hydrolysis, is not obtained from TEMPO, and/or is not obtained via enzymatic hydrolysis of lignocellulosic biomass or cellulose.

As intended herein, "nanocellulose" is broadly defined to include a range of cellulosic materials, including but not limited to microfibrillated cellulose, nanofibrillated cellulose, microcrystalline cellulose, nanocrystalline cellulose, and particulated or fibrillated dissolving pulp. In certain embodiments, the nanocellulose includes particles having at least one length dimension (e.g., diameter) on the nanometer scale. In some embodiments, the nanocellulose has particles with all average dimensions greater than 1 micron, such as for certain microfibrillated celluloses.

"Nanofibrillated cellulose" or equivalently "cellulose nanofibrils" means cellulose fibers or regions that contain nanometer-sized particles or fibers, or both micron-sized and nanometer-sized particles or fibers. "Nanocrystalline cellulose" or equivalently "cellulose nanocrystals" means cellulose particles, regions, or crystals that contain nanometer-sized domains, or both micron-sized and nanometer-sized domains. "Micron-sized" includes from 1 μm to 100 μm and "nanometer-sized" includes from 0.01 nm to 1000 nm (1 μm). Larger domains (including long fibers) may also be present in any of these materials.

The particular size and shape of the nanocellulose can range from nanometer scale up to micron scale, in width and/or length. Cellulose nanofibers typically have dimensions of 5-20 nm in width and 500-5000 nm in length and contain both amorphous and crystalline domains of cellulose. Cellulose nanocrystals typically have a width of 3-8 nm and a length of 100-500 nm and are predominantly crystalline. While these ranges and dimensions are typical, this invention encompasses all nanocellulose materials, regardless of particle shapes or particle dimensions.

Some embodiments employ a blend of nanocellulose crystals and fibrils. A blend of nanocellulose crystals and fibrils may contain from 1% to 99% nanocellulose crystals and from 99% to 1% of nanocellulose fibrils, respectively. In various embodiments, the blend of nanocellulose crystals and fibrils contains 2%, 5%, 10%, 15%, 20%, 25%, 30%, 35%, 40%, 45%, 50%, 55%, 60%, 65%, 70%, 75%, 80%, 85%, 90%, 95%, or 98% (all weight percentages) of nanocellulose crystals, with the rest of the nanocellulose being nanocellulose fibrils.

Some embodiments employ a blend of cellulose nanofibrils and microfibrils. A blend of cellulose nanofibrils and cellulose microfibrils may contain from 1% to 99% cellulose nanofibrils and from 99% to 1% of cellulose microfibrils, respectively. In various embodiments, the blend of cellulose nanofibrils and microfibrils contains 2%, 5%, 10%, 15%, 20%, 25%, 30%, 35%, 40%, 45%, 50%, 55%, 60%, 65%, 70%, 75%, 80%, 85%, 90%, 95%, or 98% (all weight percentages) of cellulose nanofibrils, with the rest being cellulose microfibrils.

One characteristic of a nanocellulose blend is the wide range of particles sizes present, since nanocellulose fibrils are much larger than nanocellulose crystals. The nanocellulose crystal width may vary from about 2 nanometers to about 10 nanometers, or from about 3 nanometers to about 6 nanometers, for example. The nanocellulose crystal length may vary from about 50 nanometers to about 500 nanometers, or from about 100 nanometers to about 350 nanometers, for example. The nanocellulose fibril width may vary from about 5 nanometers to about 100 nanometers, or from about 10 nanometers to about 50 nanometers, for example. The nanocellulose fibril length may vary from about 200 nanometers to about 10 microns, or from about 400 nanometers to about 3 microns, for example. The average nanocellulose particle width in the blend may vary from about 3 nanometers to about 50 nanometers, such as from about 5 nanometers to about 30 nanometers. The average nanocellulose particle length in the blend may vary from about 50 nanometers to about 5 microns, such as from about 100 nanometers to about 2 microns.

In some variations, nanocellulose is obtained from a process that comprises:

(a) providing a lignocellulosic biomass feedstock;

(b) fractionating the feedstock in the presence of an acid, a solvent for lignin, and water, to generate cellulose-rich solids and a liquid containing hemicellulose and lignin;

(c) mechanically treating the cellulose-rich solids to form cellulose fibrils and/or cellulose crystals, thereby generating a nanocellulose material having a crystallinity (i.e., cellulose crystallinity) of at least 60%; and (d) recovering the nanocellulose material.

In some embodiments, the acid is selected from the group consisting of sulfur dioxide, sulfurous acid, sulfur trioxide, sulfuric acid, lignosulfonic acid, and combinations thereof. In particular embodiments, the acid is sulfur dioxide.

The water for fractionation may be replaced by another polar solvent, at least in part. Typically nanocellulose is made in aqueous solution, but that is not strictly necessary. The biomass fractionation procedure to make nanocellulose may in principle use a polar solvent, such as glycerol or ethanol, in place of water or in addition to water. Thus while most of this disclosure refers to water as the primary or only polar solvent in the starting nanocellulose slurry, it will be understood that one or more polar solvents other than water may be utilized.

In some embodiments, during step (c), the cellulose-rich solids are treated with a total mechanical energy of less than about 5000 kilowatt-hours per ton of the cellulose-rich solids, such as less than about 4000, 3000, 2000, or 1000 kilowatt-hours per ton of the cellulose-rich solids. Energy consumption may be measured in any other suitable units. An ammeter measuring current drawn by a motor driving the mechanical treatment device is one way to obtain an estimate of the total mechanical energy.

Mechanically treating in step (c) may employ one or more known techniques such as, but by no means limited to, milling, grinding, beating, sonicating, or any other means to form or release nanofibrils and/or nanocrystals in the cellulose. Essentially, any type of mill or device that physically separates fibers may be utilized. Such mills are well-known in the industry and include, without limitation, Valley beaters, single disk refiners, double disk refiners, conical refiners, including both wide angle and narrow angle, cylindrical refiners, homogenizers, microfluidizers, and other similar milling or grinding apparatus. See, for example, Smook, *Handbook for Pulp & Paper Technologists*, Tappi Press, 1992; and Hubbe et al., "Cellulose Nanocomposites: A Review," *BioResources* 3(3), pages 929-980 (2008).

The extent of mechanical treatment may be monitored during the process by any of several means. Certain optical instruments can provide continuous data relating to the fiber length distributions and % fines, either of which may be used to define endpoints for the mechanical treatment step. The time, temperature, and pressure may vary during mechanical treatment. For example, in some embodiments, sonication for a time from about 5 minutes to 2 hours, at ambient temperature and pressure, may be utilized.

In some embodiments, a portion of the cellulose-rich solids is converted to nanofibrils while the remainder of the cellulose-rich solids is not fibrillated. In various embodiments, about 10%, 20%, 30%, 40%, 50%, 60%, 70%, 80%, 90%, 95%, 99%, or substantially all of the cellulose-rich solids are fibrillated into nanofibrils.

In some embodiments, a portion of the nanofibrils is converted to nanocrystals while the remainder of the nanofibrils is not converted to nanocrystals. In various embodiments, about 10%, 20%, 30%, 40%, 50%, 60%, 70%, 80%, 90%, 95%, 99%, or substantially all of the nanofibrils are converted to nanocrystals. During drying, it is possible for a small amount of nanocrystals to come back together and form nanofibrils.

Following mechanical treatment, the nanocellulose material may be classified by particle size. A portion of material may be subjected to a separate process, such as enzymatic hydrolysis to produce glucose. Such material may have good crystallinity, for example, but may not have desirable particle size or degree of polymerization.

Step (c) may further comprise treatment of the cellulose-rich solids with one or more enzymes or with one or more acids. When acids are employed, they may be selected from the group consisting of sulfur dioxide, sulfurous acid, lignosulfonic acid, acetic acid, formic acid, and combinations thereof. Acids associated with hemicellulose, such as acetic acid or uronic acids, may be employed, alone or in conjunction with other acids. Also, step (c) may include treatment of the cellulose-rich solids with heat. In some embodiments, step (c) does not employ any enzymes or acids.

In step (c), when an acid is employed, the acid may be a strong acid such as sulfuric acid, nitric acid, or phosphoric acid, for example. Weaker acids may be employed, under more severe temperature and/or time. Enzymes that hydrolyze cellulose (i.e., cellulases) and possibly hemicellulose (i.e., with hemicellulase activity) may be employed in step (c), either instead of acids, or potentially in a sequential configuration before or after acidic hydrolysis.

In some embodiments, the process comprises enzymatically treating the cellulose-rich solids to hydrolyze amorphous cellulose. In other embodiments, or sequentially prior to or after enzymatic treatment, the process may comprise acid-treating the cellulose-rich solids to hydrolyze amorphous cellulose.

In some embodiments, the process further comprises enzymatically treating the nanocrystalline cellulose. In other embodiments, or sequentially prior to or after enzymatic treatment, the process further comprises acid-treating treating the nanocrystalline cellulose.

If desired, an enzymatic treatment may be employed prior to, or possibly simultaneously with, the mechanical treatment. However, in preferred embodiments, no enzyme treatment is necessary to hydrolyze amorphous cellulose or weaken the structure of the fiber walls before isolation of nanofibers.

Following mechanical treatment, the nanocellulose may be recovered. Separation of cellulose nanofibrils and/or nanocrystals may be accomplished using apparatus capable of disintegrating the ultrastructure of the cell wall while preserving the integrity of the nanofibrils. For example, a homogenizer may be employed. In some embodiments, cellulose aggregate fibrils are recovered, having component fibrils in a range of 1-100 nm width, wherein the fibrils have not been completely separated from each other.

The process may further comprise bleaching the cellulose-rich solids prior to step (c) and/or as part of step (c). Alternatively, or additionally, the process may further comprise bleaching the nanocellulose material during step (c) and/or following step (c). Any known bleaching technology or sequence may be employed, including enzymatic bleaching.

Optionally, the process further comprises hydrolyzing amorphous cellulose into glucose in step (b) and/or step (c), recovering the glucose, and fermenting the glucose to a fermentation product. Optionally, the process further comprises recovering, fermenting, or further treating hemicellulosic sugars derived from the hemicellulose. Optionally, the process further comprises recovering, combusting, or further treating the lignin.

The nanocellulose material may include, or consist essentially of, nanofibrillated cellulose. The nanocellulose material may include, or consist essentially of, nanocrystalline cellulose. In some embodiments, the nanocellulose material may include, or consist essentially of, nanofibrillated cellulose and nanocrystalline cellulose.

In some embodiments, the crystallinity of the cellulose-rich solids (i.e., the nanocellulose precursor material) is at least 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86% or higher. In these or other embodiments, the crystallinity of the nanocellulose material is at least 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86% or higher. The crystallinity may be measured using any known techniques. For example, X-ray diffraction and solid-state $^{13}C$ nuclear magnetic resonance may be utilized.

In some embodiments, the nanocellulose material is characterized by an average degree of polymerization from about 100 to about 3000, such as about 125, 150, 175, 200, 225, 250, 300, 400, 500, 600, 700, 800, 900, 1000, 1100, 1200, 1300, 1400, 1500, 2000, 2500, or 2600. For example, the nanocellulose material may be characterized by an average degree of polymerization from about 300 to about 700, or from about 150 to about 250. The nanocellulose material, when in the form of nanocrystals, may have a degree of polymerization less than 100, such as about 75, 50, 25, or 10. Portions of the material may have a degree of polymerization that is higher than 3000, 4000, or 5000.

In some embodiments, the nanocellulose material is characterized by a degree of polymerization distribution having a single peak. In other embodiments, the nanocellulose material is characterized by a degree of polymerization distribution having two peaks, such as one centered in the range of 150-250 and another peak centered in the range of 300-700.

In some embodiments, the nanocellulose material is characterized by an average length-to-width aspect ratio of particles from about 10 to about 1000, such as about 15, 20, 25, 35, 50, 75, 100, 150, 200, 250, 300, 400, or 500. Nanofibrils are generally associated with higher aspect ratios than nanocrystals. Nanocrystals, for example, may have a length range of about 100 nm to 500 nm and a diameter of about 4 nm, translating to an aspect ratio of 25 to 125. Nanofibrils may have a length of about 2000 nm and diameter range of 5 to 50 nm, translating to an aspect ratio of 40 to 400. In some embodiments, the aspect ratio is less than 50, less than 45, less than 40, less than 35, less than 30, less than 25, less than 20, less than 15, or less than 10.

In some embodiments, the nanocellulose contains less than 0.05 wt % sulfur, such as about 0.02 wt % sulfur or less, including no detectible sulfur. In some embodiments, the nanocellulose contains no sulfate half-ester groups attached to the surface of the nanocellulose particles, as these groups may reduce the thermal stability of the nanocellulose.

The "thermal-decomposition onset temperature" of a material is defined by a thermal gravimetric analysis of the material. Thermal gravimetric analysis, also known as thermogravimetric analysis (TGA), is a technique in which the mass of a substance is monitored as a function of temperature or time as the sample specimen is subjected to a controlled temperature program in a controlled atmosphere. The thermal gravimetric analysis may utilize a PerkinElmer STA6000 Simultaneous Thermal Analyzer (London, UK). The abscissa (x-axis) is temperature and the ordinate (y-axis) is weight percent (%). A descending TGA thermal curve indicates a weight loss occurred. From the TGA thermal curve, the extrapolated onset temperature can be calculated, denoting the temperature at which the weight loss begins. The extrapolated onset temperature is a reproducible temperature calculation and it is specified to be used by ASTM and ISO for TGA. The extrapolated onset is the point of intersection of the tangent drawn at the point of greatest slope on the leading edge of the peak with the extrapolated base line. This technique may be applied to the nanocellulose or the dispersion/drying agent.

For purposes of this specification, to determine the thermal-decomposition onset temperature of nanocellulose, samples are heated from 50° C. to 600° C. at a heating rate of 10° C./min under nitrogen atmosphere with a flow rate of 40 mL/min, using a PerkinElmer STA6000 Simultaneous Thermal Analyzer. The mass is measured as a function of temperature. Mass loss, other than water loss, indicates thermal decomposition of the material. The extrapolated onset temperature from the TGA graph is the estimated thermal-decomposition onset temperature of the nanocellulose or the dispersion/drying agent.

In some preferred embodiments, the nanocellulose is characterized by a thermal-decomposition onset temperature of about, or at least about, 300° C., 310° C., 320° C., or 330° C., such as in the case of BioPlus® cellulose nanocrystals or nanofibrils generated from fractionation with an acid catalyst, a solvent for lignin, and water. In other embodiments, the nanocellulose is characterized by a thermal-decomposition onset temperature of about 220° C. to about 300° C., such as about 225° C. in the case of cellulose nanofibrils generated from TEMPO or about 285° C. in the case of cellulose nanocrystals generated from sulfuric acid.

Optionally, the nanocellulose itself is functionalized with one or more surface functional groups, to generate nanocellulose derivatives. Such functionalization may be done to improve compatibility with the matrix polymer, for example, or to impart special properties to the nanocellulose. Because nanocellulose has high surface area and high concentration of surface hydroxyl groups, targeted surface modification may introduce virtually any desired surface functionality.

For example, nanocellulose derivatives may be selected from the group consisting of nanocellulose esters, nanocellulose ethers, nanocellulose ether esters, alkylated nanocellulose compounds, cross-linked nanocellulose compounds, acid-functionalized nanocellulose compounds, base-functionalized nanocellulose compounds, and combinations thereof. Various types of nanocellulose functionalization or derivatization may be employed, such as functionalization using polymers, chemical surface modification, functionalization using nanoparticles (i.e. other nanoparticles besides the nanocellulose), modification with inorganics or surfactants, or biochemical modification.

In some variations, nanocellulose is obtained from a process that comprises:

(a) providing a lignocellulosic biomass feedstock;

(b) fractionating the feedstock in the presence of an acid (such as $SO_2$), or a salt thereof, and water, to generate cellulose-rich solids and a liquid containing hemicellulose and lignin;

(c) mechanically treating the cellulose-rich solids to form cellulose fibrils and/or cellulose crystals, thereby generating a nanocellulose material having a crystallinity (i.e., cellulose crystallinity) of at least 60%; and (d) recovering the nanocellulose material.

In some variations, nanocellulose is obtained from a process that comprises:

(a) providing a lignocellulosic biomass feedstock;

(b) fractionating the feedstock in the presence of water and a solvent for lignin, to generate cellulose-rich solids and a liquid containing hemicellulose and lignin;

(c) mechanically treating the cellulose-rich solids to form cellulose fibrils and/or cellulose crystals, thereby generating a nanocellulose material having a crystallinity (i.e., cellulose crystallinity) of at least 60%; and (d) recovering the nanocellulose material.

In some variations, nanocellulose is obtained from a process that comprises:

(a) providing a lignocellulosic biomass feedstock;

(b) fractionating the feedstock in the presence of steam or hot water, to generate cellulose-rich solids and a liquid containing hemicellulose and lignin;

(c) mechanically treating the cellulose-rich solids to form cellulose fibrils and/or cellulose crystals, thereby generating a nanocellulose material having a crystallinity (i.e., cellulose crystallinity) of at least 60%; and (d) recovering the nanocellulose material.

The dewatered nanocellulose may be used in a wide range of end-use applications. In many embodiments, the nanocellulose is incorporated into a matrix material to form a nanocellulose-containing composite material. Nanocellulose may be compounded to make a composite material using a variety of apparatus, such as (but not limited to) single-screw extruders, twin-screw extruders, injection-molding lines, compression-molding lines, kneaders, calenders, rotor-stator dispersion mills, high-shear mixers, agitated tanks, or in-line mixers.

A nanocellulose-containing composite may be 3D-printed. Three-dimensional (3D) printing, or additive manufacturing, is a process by which an object is created in its three-dimensional form using a specialized printer. The printer receives instructions from a design file that is created in a computer with the help of a 3D modeling program. The file or the digital blueprint of the object to be printed, is then sliced into two-dimensional (2D) representations that are sent to the printer. The layers of material are built according to the information contained in the file; the layers keep on adding until the full object is printed. The process of 3D printing requires much more time and involves significant capital investments as compared to 2D printing, but offers a wide array of advantages—such as the ability, in principle, to print any geometry.

The degree of dispersion of nanocellulose in the final composite may be measured or qualitatively assessed. The degree of dispersion is inverse to the degree of agglomeration. If there is perfect, uniform dispersion, then there is no particle agglomeration. This invention does not require perfect dispersion such that every single nanoparticle is isolated from every other nanoparticle.

Nanocellulose dispersion may be measured or qualitatively assessed using techniques such as scanning electron microscopy, transmission electron microscopy, interferometric microscopy, confocal laser scanning microscopy, optical microscopy, small-angle X-ray scattering, atomic force microscopy, dynamic light scattering, nanotomography, or thermogravimetric analysis, for example.

Nanocellulose dispersion may also be measured or qualitatively assessed using calibration techniques in which validated polymers with known nanocellulose dispersions are tested for a relevant property. Test samples are then measured for the same property which is correlated with the degree of nanocellulose dispersion using a pre-determined graph, equation, or look-up table.

In a composite product, the dispersion/drying agent, if present, may be in the same phase as the nanocellulose, the same phase as the matrix material, and/or in a distinct phase. The dispersion/drying agent may be disposed between nanocellulose particles and matrix material. In some embodiments, the dispersion/drying agent surrounds nanocellulose particles.

In some embodiments, the nanocellulose-containing composite product is configured as a catalyst, catalyst substrate, or co-catalyst. In some embodiments, the nanocellulose-containing composite product is configured electrochemically for carrying or storing an electrical current or voltage.

In some embodiments, the nanocellulose-containing composite product is incorporated into a filter, membrane, or other separation device.

In some embodiments, the nanocellulose-containing composite product is incorporated as an additive into a coating, paint, or adhesive. In some embodiments, the nanocellulose-containing composite product is a cement additive.

A nanocellulose-containing composite product may include any of the disclosed compositions. Many composite products are possible. For example, a composite product may be selected from the group consisting of a structural object, a foam, an aerogel, a carbon composite, a film, a coating, a coating precursor, a current or voltage carrier, a filter, a membrane, a catalyst, a catalyst substrate, a coating or coating additive, a paint or paint additive, an adhesive or adhesive additive, an ink or ink additive, a cement additive, a paper coating or paper additive, a thickening agent, a rheological modifier, an additive for a drilling fluid, and combinations or derivatives thereof.

Nanocellulose-containing composite products provided herein are suitable as coating materials as they are expected to have a high oxygen barrier and affinity to wood fibers for application in food packaging and printing papers. Alternatively, or additionally, the nanocellulose-containing composite products may be incorporated into products to improve barrier properties or to improve nucleation, for example.

Nanocellulose-containing composite products provided herein are suitable as additives to improve the durability of paint, protecting paints and varnishes from attrition caused by UV radiation.

Nanocellulose-containing composite products provided herein are suitable as thickening agents in food and cosmetics products. Nanocellulose can be used as thixotropic, biodegradable, dimensionally stable thickener (stable against temperature and salt addition). Nanocellulose-polymer composite products provided herein are suitable as a Pickering stabilizer for emulsions and particle stabilized foam. The large surface area of nanocellulose in combination with its biodegradability makes it attractive materials for highly porous, mechanically stable aerogels.

In other embodiments, a masterbatch product is ultimately incorporated into a structural object, a foam, an aerogel, a carbon composite, a film, a coating, a coating precursor, a current or voltage carrier, a filter, a membrane, a catalyst, a catalyst substrate, a coating additive, a paint additive, an adhesive additive, a cement additive, a paper coating, a thickening agent, a rheological modifier, an additive for a drilling fluid, and combinations or derivatives thereof.

Other applications suitable to the present invention include high-strength spun fibers and textiles, advanced composite materials, barrier films, paints, lacquers, adhesives, switchable optical devices, pharmaceuticals, drug delivery systems, bone replacement, tooth repair, paper, packaging, building products, additives for foods and cosmetics, and hydrogels.

Aerospace and transportation composites may benefit from the disclosed particulate masterbatches. Automotive applications include nanocellulose composites with polypropylene, polyamide (e.g. Nylons), or polyesters (e.g. PBT).

Strength enhancement with nanocellulose increases both the binding area and binding strength for application in high-strength, high-bulk, high-filler content paper and board with enhanced moisture and oxygen barrier properties.

In some embodiments, the masterbatch is incorporated as a thickening agent or rheological modifier. For example, the masterbatch may be an additive in a drilling or fracturing fluid, such as (but not limited to) an oil recovery fluid and/or a gas recovery fluid.

The masterbatch may generally be useful in any system that can benefit from incorporation of the masterbatch. As discussed in this specification, systems include, but are by no means limited to, polymers, oligomers, paper, paperboard, fiber and wood composites, emulsions, hydrogels, carbon, organic solids, inorganic solids, oils, organic liquids, inorganic liquids, cementitious materials (e.g., concrete or cement), minerals, ceramics, metals, metal alloys, glass, or a combination thereof. A non-polymer matrix material may be an adhesive matrix, a battery electrode matrix, a bioink matrix, or an electronic ink matrix, for example.

In this detailed description, reference has been made to multiple embodiments of the invention and non-limiting examples relating to how the invention can be understood and practiced. Other embodiments that do not provide all of the features and advantages set forth herein may be utilized, without departing from the spirit and scope of the present invention. This invention incorporates routine experimentation and optimization of the methods and systems described herein. Such modifications and variations are considered to be within the scope of the invention defined by the claims.

All publications, patents, and patent applications cited in this specification are herein incorporated by reference in their entirety as if each publication, patent, or patent application were specifically and individually put forth herein. WO 2020/160565 A1 published on Aug. 6, 2020 is hereby incorporated by reference herein. WO 2020142793 A1 published on Jul. 9, 2020 is hereby incorporated by reference herein.

Where methods and steps described above indicate certain events occurring in certain order, those of ordinary skill in the art will recognize that the ordering of certain steps may be modified and that such modifications are in accordance with the variations of the invention. Additionally, certain of the steps may be performed concurrently in a parallel process when possible, as well as performed sequentially.

Therefore, to the extent there are variations of the invention, which are within the spirit of the disclosure or equivalent to the inventions found in the appended claims, it is the intent that this patent will cover those variations as well. The present invention shall only be limited by what is claimed.

What is claimed is:

1. A process for making a particulate masterbatch, said process comprising:

(a) providing a plurality of particulates;

(b) introducing said plurality of particulates and a pH-adjusting agent to a first mixing unit;

(c) conveying an aqueous polymer latex and said plurality of particulates from step (a) or from step (b) to a second mixing unit, thereby generating a particulate-latex mixture comprising water;

(d) conveying said particulate-latex mixture and a first process additive to a third mixing unit;

(e) conveying said particulate-latex mixture to a homogenizer, thereby generating a homogenized particulate-latex mixture;

(f) optionally conveying said homogenized particulate-latex mixture to a centrifuge to remove a first portion of said water, thereby generating a dewatered and homogenized particulate-latex mixture; and (g) conveying said dewatered and homogenized particulate-latex mixture or, if step (f) is not conducted, conveying said homogenized particulate-latex mixture from step (e) to a screw mixer, wherein said screw mixer is configured to remove a second portion of said water, thereby generating a particulate masterbatch, wherein steps (a)-(g) are substantially conducted sequentially.

2. The process of claim 1, wherein said second mixing unit is a second static inline mixer.

3. The process of claim 1, wherein said plurality of particulates is first introduced to a pre-mixing unit (i) prior to step (b), or (ii) prior to step (c).

4. The process of claim 1, wherein said plurality of particulates is first slurried prior to step (b).

5. The process of claim 1, wherein step (f) utilizes heating to enhance water removal.

6. The process of claim 1, wherein said screw mixer is a twin-screw extruder.

7. The process of claim 6, wherein said twin-screw extruder is configured with a plurality of extruder zones with independently controlled temperatures, and a plurality of vacuum vents, for enhanced removal of said second portion of water.

8. The process of claim 1, wherein said screw mixer is a twin-rotor mixer.

9. The process of claim 1, wherein said process is continuous or semi-continuous.

10. The process of claim 1, wherein said particulate masterbatch is characterized by a dispersion index of at least 50.

11. The process of claim 1, wherein said process does not employ a polymer latex coagulating agent.

12. The process of claim 1, wherein said plurality of particulates includes biomass-derived particulates selected from the group consisting of cellulose, nanocellulose, hemicellulose, nanohemicellulose, lignin, nanolignin, nanolignocellulose, and combinations thereof.

13. The process of claim 1, wherein said plurality of particulates includes particulates selected from the group consisting of silica, alumina, clay, nano-clay, zeolites, ceramics, metals, glass, polymers, and combinations thereof.

14. The process of claim 1, wherein said plurality of particulates includes carbonaceous particulates selected from the group consisting of graphite, graphene, activated carbon, carbon nanotubes, carbon fibers, biochar, coke, nanodiamonds, and combinations thereof.

15. A process for making a particulate masterbatch, said process comprising:

(a) providing a plurality of particulates;

(b) optionally introducing said plurality of particulates and a pH-adjusting agent to a first mixing unit;

(c) conveying an aqueous polymer latex and said plurality of particulates from step (a) or from step (b), if conducted, to a second mixing unit, thereby generating a particulate-latex mixture comprising water, wherein said second mixing unit is a second static inline mixer;

(d) optionally conveying said particulate-latex mixture and a first process additive to a third mixing unit;

(e) conveying said particulate-latex mixture to a homogenizer, thereby generating a homogenized particulate-latex mixture;

(f) optionally conveying said homogenized particulate-latex mixture to a centrifuge to remove a first portion of said water, thereby generating a dewatered and homogenized particulate-latex mixture; and (g) conveying said dewatered and homogenized particulate-latex mixture or, if step (f) is not conducted, conveying said homogenized particulate-latex mixture from step (e) to a screw mixer, wherein said screw mixer is configured to remove a second portion of said water, thereby generating a particulate masterbatch, wherein steps (a), (c), (e), (f), and (g) are substantially conducted sequentially.

16. A process for making a particulate masterbatch, said process comprising:

(a) providing a plurality of particulates;

(b) optionally introducing said plurality of particulates and a pH-adjusting agent to a first mixing unit;

(c) conveying an aqueous polymer latex and said plurality of particulates from step (a) or from step (b), if conducted, to a second mixing unit, thereby generating a particulate-latex mixture comprising water;

(d) optionally conveying said particulate-latex mixture and a first process additive to a third mixing unit;

(e) conveying said particulate-latex mixture to a homogenizer, thereby generating a homogenized particulate-latex mixture;

(f) conveying said homogenized particulate-latex mixture to a centrifuge to remove a first portion of said water, thereby generating a dewatered and homogenized particulate-latex mixture, wherein step (f) utilizes heating to enhance water removal; and (g) conveying said dewatered and homogenized particulate-latex mixture to a screw mixer, wherein said screw mixer is configured to remove a second portion of said water, thereby generating a particulate masterbatch, wherein steps (a), (c), (e), (f), and (g) are substantially conducted sequentially.

* * * * *